(12) United States Patent
Brown et al.

(10) Patent No.: US 11,823,677 B2
(45) Date of Patent: *Nov. 21, 2023

(54) INTERACTION WITH A PORTION OF A CONTENT ITEM THROUGH A VIRTUAL ASSISTANT

(71) Applicant: Verint Americas Inc., Alpharetta, GA (US)

(72) Inventors: Fred A. Brown, Alpharetta, GA (US); Tanya M. Miller, Alpharetta, GA (US)

(73) Assignee: VERINT AMERICAS INC., Alpharetta, GA (US)

(*) Notice: Subject to any disclaimer, the term of this patent is extended or adjusted under 35 U.S.C. 154(b) by 0 days.

This patent is subject to a terminal disclaimer.

(21) Appl. No.: 17/548,801

(22) Filed: Dec. 13, 2021

(65) Prior Publication Data

US 2022/0172718 A1 Jun. 2, 2022

Related U.S. Application Data

(63) Continuation of application No. 16/531,380, filed on Aug. 5, 2019, now Pat. No. 11,200,895, which is a
(Continued)

(51) Int. Cl.
*G10L 15/16* (2006.01)
*G10L 15/00* (2013.01)
(Continued)

(52) U.S. Cl.
CPC ............ *G10L 15/22* (2013.01); *G06F 3/167* (2013.01); *G06F 9/453* (2018.02); *G10L 15/1822* (2013.01); *G10L 2015/223* (2013.01)

(58) Field of Classification Search
CPC ................................ G10L 15/16; G10L 15/00
See application file for complete search history.

(56) References Cited

U.S. PATENT DOCUMENTS

| 5,677,835 A | 10/1997 | Carbonell et al. |
| 5,764,736 A | 6/1998 | Shachar et al. |

(Continued)

FOREIGN PATENT DOCUMENTS

| EP | 1980963 | 10/2008 |
| WO | 2009/109980 | 9/2009 |

OTHER PUBLICATIONS

Airport One, Equipment & Services for Airports, retrieved on Apr. 22, 2013 from http://www.airportone.com/ airportvirtualassistancesystem.html, 2013, 20 pages.

(Continued)

*Primary Examiner* — Shreyans A Patel
(74) *Attorney, Agent, or Firm* — Meunier Carlin & Curfman LLC

(57) ABSTRACT

Techniques for interacting with a portion of a content item through a virtual assistant are described herein. The techniques may include identifying a portion of a content item that is relevant to user input and causing an action to be performed related to the portion of the content item. The action may include, for example, displaying the portion of the content item on a smart device in a displayable format that is adapted to a display characteristic of the smart device, performing a task for a user that satisfies the user input, and so on.

15 Claims, 12 Drawing Sheets

Related U.S. Application Data continuation of application No. 15/612,511, filed on Jun. 2, 2017, now Pat. No. 10,373,616, which is a continuation of application No. 13/774,381, filed on Feb. 22, 2013, now Pat. No. 9,672,822.

(51) Int. Cl.
*G10L 15/22* (2006.01)
*G06F 3/16* (2006.01)
*G06F 9/451* (2018.01)
*G10L 15/18* (2013.01)

(56) References Cited

U.S. PATENT DOCUMENTS

| | | | |
|---|---|---|---|
| 7,181,492 B2 | 2/2007 | Wen et al. | |
| 7,283,973 B1 | 10/2007 | Loghmani et al. | |
| 7,429,243 B2 | 9/2008 | KenKnight et al. | |
| 7,461,352 B2* | 12/2008 | Katsuranis | G06F 3/011 715/800 |
| 7,487,248 B2 | 2/2009 | Moran et al. | |
| 7,548,756 B2 | 6/2009 | Velthuis et al. | |
| 7,610,382 B1 | 10/2009 | Siegel | |
| 7,809,842 B2 | 10/2010 | Moran et al. | |
| 7,877,450 B2 | 1/2011 | Odell et al. | |
| 8,306,516 B2 | 11/2012 | Levien et al. | |
| 8,352,266 B2 | 1/2013 | Farmaner et al. | |
| 8,370,429 B2 | 2/2013 | Odell et al. | |
| 8,438,318 B2* | 5/2013 | McRae | H04N 21/43637 710/33 |
| 8,467,392 B2 | 6/2013 | Li et al. | |
| 8,495,196 B2 | 7/2013 | Harrang et al. | |
| 8,677,377 B2 | 3/2014 | Cheyer et al. | |
| 9,224,387 B1 | 12/2015 | Slifka | |
| 9,251,266 B2 | 2/2016 | Carter et al. | |
| 10,373,616 B2* | 8/2019 | Brown | G06F 9/453 |
| 11,200,895 B2* | 12/2021 | Brown | G06F 9/453 |
| 2002/0059425 A1 | 5/2002 | Belfiore et al. | |
| 2002/0062345 A1 | 5/2002 | Guedalia et al. | |
| 2002/0133347 A1 | 9/2002 | Schoneburg et al. | |
| 2002/0161896 A1 | 10/2002 | Wen et al. | |
| 2003/0055977 A1 | 3/2003 | Miller | |
| 2003/0154398 A1 | 8/2003 | Eaton et al. | |
| 2003/0195963 A1 | 10/2003 | Song et al. | |
| 2004/0068567 A1 | 4/2004 | Moran et al. | |
| 2004/0102971 A1 | 5/2004 | Lipscher et al. | |
| 2004/0199375 A1 | 10/2004 | Ehsani et al. | |
| 2005/0108001 A1 | 5/2005 | Aarskog | |
| 2006/0067352 A1 | 3/2006 | John et al. | |
| 2006/0074980 A1 | 4/2006 | Sarkar | |
| 2006/0083208 A1 | 4/2006 | Lin | |
| 2006/0114852 A1 | 6/2006 | Levien et al. | |
| 2006/0271696 A1 | 11/2006 | Chen et al. | |
| 2007/0032225 A1 | 2/2007 | Konicek et al. | |
| 2007/0136072 A1 | 6/2007 | Sampath | |
| 2007/0288426 A1 | 12/2007 | Schachter | |
| 2008/0005158 A1 | 1/2008 | Zartler et al. | |
| 2008/0189374 A1 | 8/2008 | Odell et al. | |
| 2008/0235194 A1 | 9/2008 | Shima et al. | |
| 2008/0247359 A1 | 10/2008 | Bengtsson et al. | |
| 2008/0256446 A1 | 10/2008 | Yamamoto | |
| 2009/0006660 A1 | 1/2009 | Bawcutt et al. | |
| 2009/0018834 A1 | 1/2009 | Cooper et al. | |
| 2009/0023430 A1 | 1/2009 | Levien et al. | |
| 2009/0030684 A1* | 1/2009 | Cerra | G10L 15/16 704/E15.001 |
| 2009/0030800 A1* | 1/2009 | Grois | G06Q 30/02 707/999.005 |
| 2009/0111437 A1 | 4/2009 | Elman et al. | |
| 2009/0138506 A1 | 5/2009 | Van Riel | |
| 2009/0138606 A1 | 5/2009 | Moran et al. | |
| 2009/0143053 A1 | 6/2009 | Levien et al. | |
| 2009/0209342 A1 | 8/2009 | Okada | |
| 2009/0209345 A1 | 8/2009 | Okada | |
| 2009/0216691 A1 | 8/2009 | Borzestowski et al. | |
| 2010/0053069 A1* | 3/2010 | Tricoukes | G06F 3/1431 345/1.3 |
| 2010/0114571 A1 | 5/2010 | Nagatomo | |
| 2010/0145924 A1 | 6/2010 | Zabramski et al. | |
| 2010/0211379 A1 | 8/2010 | Gorman et al. | |
| 2010/0274869 A1 | 10/2010 | Warila et al. | |
| 2010/0311401 A1 | 12/2010 | Oh et al. | |
| 2011/0113114 A1 | 5/2011 | Odell et al. | |
| 2011/0137943 A1 | 6/2011 | Asano | |
| 2011/0221656 A1* | 9/2011 | Haddick | G06V 40/19 345/156 |
| 2011/0225019 A1* | 9/2011 | Taylor | G06Q 10/0637 705/7.29 |
| 2011/0270933 A1 | 11/2011 | Jones et al. | |
| 2011/0302092 A1* | 12/2011 | Basir | G06Q 10/20 705/305 |
| 2012/0001914 A1* | 1/2012 | Pan | G06Q 30/0241 345/428 |
| 2012/0016678 A1* | 1/2012 | Gruber | H04M 1/7243 704/E21.001 |
| 2012/0110125 A1* | 5/2012 | Chen | G06F 16/9577 709/218 |
| 2012/0123874 A1 | 5/2012 | Park | |
| 2012/0131212 A1 | 5/2012 | Tang et al. | |
| 2012/0182995 A1 | 7/2012 | Li et al. | |
| 2012/0207088 A1 | 8/2012 | Liu et al. | |
| 2012/0214458 A1 | 8/2012 | Levien et al. | |
| 2012/0242473 A1* | 9/2012 | Choi | B60K 37/06 340/441 |
| 2012/0260160 A1 | 10/2012 | Kim et al. | |
| 2012/0266093 A1* | 10/2012 | Park | H04N 21/4122 715/811 |
| 2012/0289213 A1 | 11/2012 | Levien et al. | |
| 2013/0041921 A1 | 2/2013 | Cooper et al. | |
| 2013/0086246 A1 | 4/2013 | Lee et al. | |
| 2013/0144964 A1 | 6/2013 | Odell et al. | |
| 2013/0185772 A1 | 7/2013 | Jaudon et al. | |
| 2013/0198641 A1* | 8/2013 | Brownlow | G06F 3/0485 715/738 |
| 2013/0212286 A1 | 8/2013 | Krishnakumar et al. | |
| 2014/0201351 A1* | 7/2014 | Fransen | H04L 67/535 709/224 |
| 2014/0201377 A1 | 7/2014 | Kadishay et al. | |
| 2014/0244266 A1* | 8/2014 | Brown | G06F 3/167 715/764 |
| 2014/0245140 A1 | 8/2014 | Brown et al. | |
| 2015/0033112 A1 | 1/2015 | Norwood et al. | |
| 2015/0058018 A1 | 2/2015 | Georges et al. | |
| 2022/0172718 A1* | 6/2022 | Brown | G06F 3/167 |

OTHER PUBLICATIONS

Ballantyne, D., "Dialogue and its role in the development of relationship specific knowledge," Journal of Business & Industrial Marketing, vol. 19, No. 2, 2004, pp. 114-123.

Bhaskar, J., et al., "Hybrid Approach for Emotion Classification of Audio Conversation Based on Text and Speech Mining," International Conference on Information and Communication Technologies (ICICT 2014), Procedia Computer Science, vol. 46, 2015, pp. 635-643.

Bickmore, T., et al., "Relational Agents: A Model and Implementation of Building User Trust," Proceedings of the SIGCHI Conference on Human Factors in Computing Systems (CHI '01), ACM, 2001, pp. 396-403.

Bickmore, et al., "Digestor: Device-Independent Access to the World Wide Web", Computer Networks and ISDN Systems 29, vol. 29, No. 8-13, Elsevier Science, Holland Publishing, 1997, pp. 1075-1082.

Burge, J., Emojipedia, retrieved on Nov. 12, 2019 at https://blog.emojipedia.org/author/jeremyburge.com, 2013, 2 pages.

Casale, S., et al., "Speech Emotion Classification Using Machine Learning Algorithms," The International Conference on Semantic Computing, IEEE Computer Society, 2008, pp. 158-165.

Chai, J.Y., et al., "Towards Conversational QA: Automatic Identification of Problematic Situations and User Intent," Proceedings of

(56) References Cited

OTHER PUBLICATIONS the COLING/ACL 2006 Main Conference Poster Sessions, Association for Computational Linguistics, 2006, pp. 57-64.
Coppola, N.W et al., "Building Trust in Virtual Teams," IEEE Transactions on Professional Communication, vol. 47, No. 2, 2004, pp. 95-104.
De Visser, E.J., et al., "Almost Human: Anthropomorphism Increases Trust Resilience in Cognitive Agents," Journal of Experimental Psychology: Applied, 2016, 19 pages.
Digital Trends, "Microsoft Brings Interactive SpaceTop 3D Desktop Interface to Life," retrieved on Apr. 22, 2013 at http://www.digitaltrends.com/comuting/microsoft-brings-spacetop-3d-desktop-interface-to-life, 2013, 3 pages.
Farías, D.I.H., et al., "ValenTo: Sentiment Analysis of Fgurative Language Tweets with Irony and Sarcasm," Proceedings of the 9th International Workshop on Semantic Evaluation, 2015, pp. 694-698.
Felbo, B., et al., "Using millions of emoji occurrences to learn any-domain representations for detecting sentiment, emotion and sarcasm," Proceedings of the 2017 Conference on Empirical Methods in Natural Language Processing (EMNLP), 2017, 13 pages.
Holton, J.A., "Building trust and collaboration in a virtual team," Team Performance Management: An International Journal, vol. 7, Nos. 3 and 4, 2001, pp. 36-47.
Kim, B., et al., "Two-stage multi-intent detection for spoken language understanding," Multimedia Tools and Applications, 2016, 14 pages.
Laflen, A., et al., "Okay, My Rant is Over," The Language of Emotion in Computer-Mediated Communication, Computers and Composition, vol. 29, No. 4, 2012, pp. 296-308.
Lee, M.K., et al., "Receptionist or Information Kiosk: How Do People Talk With a Robot?," Proceedings of the 2010 ACM conference on Computer Supported Cooperative Work, ACM, 2010, 10 pages.
Levy, S., "Alexa, Tell Me Where You're Going Next," Backchannel.com, available online at https://www.wired.com/2016/11/alexa-tell-me-where-youre-going-next/, 2016, 8 pages.
Loria, S., et al., "TextBlob: Simplified Text Processing," Release 0.15.2, retrieved on Nov. 12, 2019 at https://textblob.readthedocs.io/en/dev, 2014, 3 pages.
"Meet Jenn, Your Virtual Assistant at alaskaair.com", retrieved on Oct. 14, 2014 at https://web.archive.org/web/20130129150047, http://www.alaskair.com/content/about-us/site-info/ask-jenn.aspx, 2013, 2 pages.
Patently Apple, retrieved on Apr. 22, 2013 at http://www.patentlyapple.com/patently-apple/2012/01/apple-is-paving-the-way-for-a-new-3d-qui-for-ios-devices.html, 2013, 13 pages.
Sarikaya, R., et al., "An Overview of End-To-End Language Understanding and Dialog Management for Personal Digital Assistants," IEEE Workshop on Spoken Language Technology, 2016, pp. 391-397.
Shen, P., et al., "Automatic Speech Emotion Recognition Using Support Vector Machine," 2011 International Conference on Electronic and Mechanical Engineering and Information Technology (EMEIT 2011), vol. 1, 2011, 538 pages.
Ververidis, D., et al., "Emotional speech recognition: Resources, features, and methods," Speech Communication, vol. 48, 2016, pp. 1162-1181.
Wikipedia Kinectimals, retrieved on Apr. 22, 2013 at http://en.wikipedia.org/wiki/Kinectimals. 2013, 7 pages.
Xu, P., et al., "Exploiting Shared Information for Multi-intent Natural Language Sentence Classification," Interspeech, 2013, pp. 3785-3789.
Extended European Search Report, dated Sep. 22, 2016, received in connection with EP Patent Application No. 14754207.0.
International Search Report and Written Opinion, dated Aug. 27, 2014, received in connection with International Patent Application No. PCT/ US14/17440.

\* cited by examiner

INTERACTION WITH A PORTION OF A CONTENT ITEM THROUGH A VIRTUAL ASSISTANT

CROSS-REFERENCE TO RELATED APPLICATIONS

This application claims priority to and is a continuation of U.S. patent application Ser. No. 16/531,380, filed Aug. 5, 2019, now U.S. Pat. No. 11,200,895, issued Dec. 14, 2021, which claims priority to and is a continuation of U.S. patent application Ser. No. 15/612,511, filed Jun. 2, 2017, now U.S. Pat. No. 10,373,616, issued Aug. 6, 2019, which claims priority to and is a continuation of U.S. patent application Ser. No. 13/774,381, filed Feb. 22, 2013, now U.S. Pat. No. 9,672,822, issued Jun. 6, 2017, the entire contents of which are incorporated herein by reference.

BACKGROUND

A growing number of people are using smart devices, such as smart phones, tablet computers, laptop computers, and so on, to perform a variety of functionality. For example, users may utilize their smart devices to make phone calls, send emails, surf the web, find entertainment or eating establishments, consume content, and so on.

As users interact with smart devices, the users often interact with content that is intended to be interacted with on a particular type of device (e.g., a device that includes particular characteristics). For instance, while searching "online" through a mobile device, a user may view a web page that is designed or otherwise suited for display on a relatively large monitor. However, due to a relatively small display on the mobile device, the user may be required to scroll, zoom, or otherwise navigate to a portion of the web page that is of interest to the user. As such, there is an increasing need for better ways to interact with content through a smart device.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
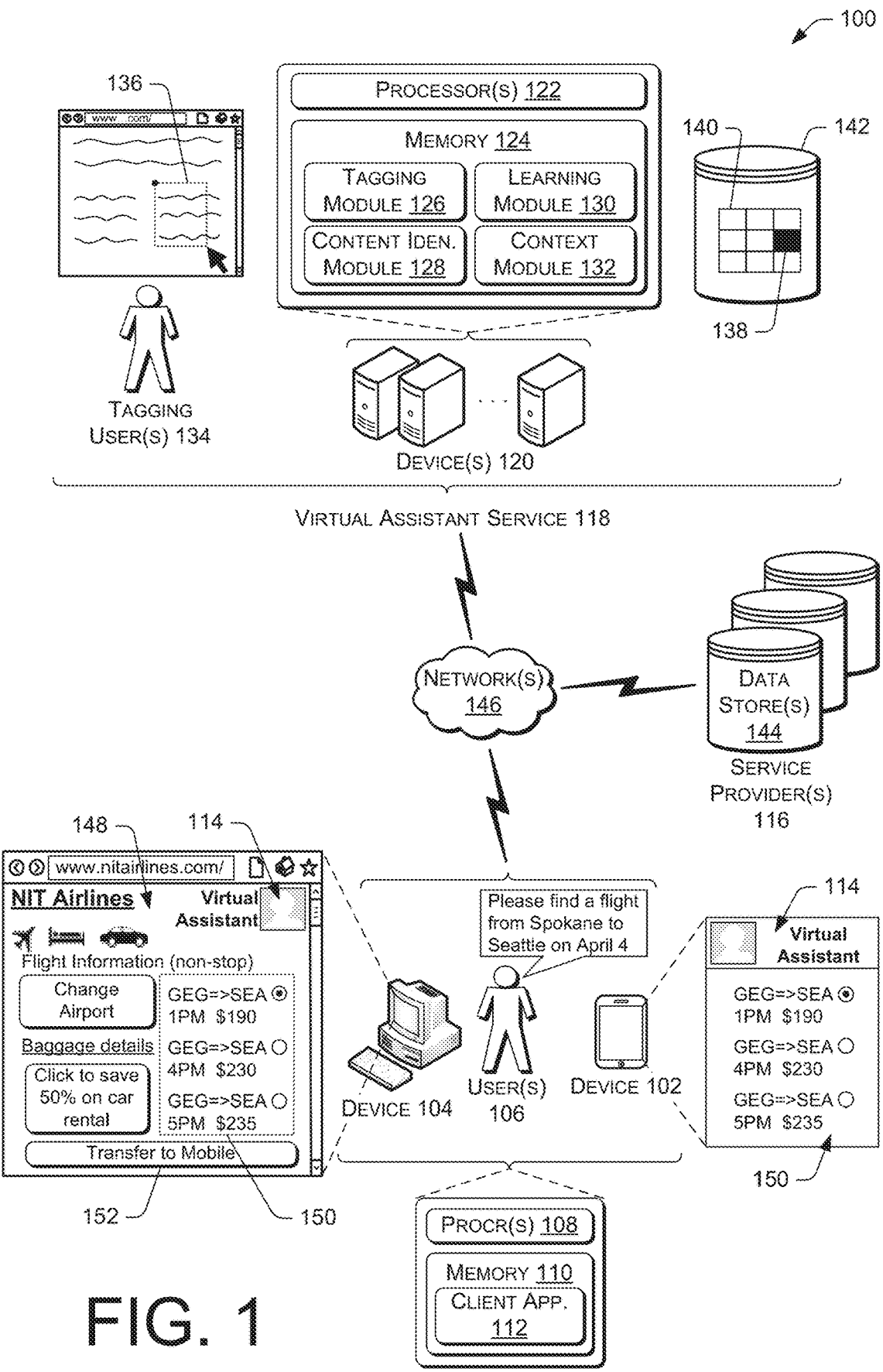
FIG. 1 illustrates an example architecture in which the techniques described herein may be implemented.

This disclosure describes techniques directed to, in part, utilizing a virtual assistant to interact with a portion of a content item. In particular implementations, a user may interface with the virtual assistant on a smart device to cause an action to be performed related to the portion of the content item. For example, based on input received from the user, the virtual assistant may display a portion of a content item that is relevant to the input, display information that is linked to a portion of a content item that is relevant to the input (e.g., display an icon or other interface element that is linked to the portion), execute a portion of an program that is related to the input, enter information into a portion of a content item based on the input (e.g., enter a password and login information into a field of a web page), shop for an item based on the input, or otherwise interact with a portion of a content item. In instances where a portion of a content item is displayed on a smart device, the portion may be presented in a manner that is adapted to the smart device (e.g., adapted to display characteristics of the device). For example, the virtual assistant may reformat the portion of the content item, navigate directly to the portion of the content item (e.g., zoom in or scroll to the portion), etc., so that the portion may be viewed in a legible format on the smart device.

To interact with a portion of a content item, a virtual assistant may interface with a user through a smart device by receiving input from the user and/or outputting one or more responses. The input may include speech, text, gesture, touch input, or any other type of input requesting an action associated with a content item. In response to receiving input from the user, the device may locate a content item that is relevant to the input. The virtual assistant may then identify a portion of the content item that is most relevant to the input of the user. The portion may be identified based on tags that have been previously associated with portions of the content item and/or an analysis of the content item. In one example, in response to a request to "Please find a flight from Spokane to Seattle on April 4," the virtual assistant may identify a particular portion of an airline web page, namely flight information (e.g., departure times and pricing details), as being relevant to the request for a flight. In another example, in response to a request to "Please check me in to my flight today," the virtual assistant may identify a particular input field on an airline web page, namely a field to input a confirmation number, as being relevant to checking-in an individual to a flight.

The identified portion of the content item may then be used to perform an action (e.g., a task) that satisfies the input of the user. For example, the action may include displaying a portion of a content item, displaying information that is linked to a portion of a content item that is relevant to the input, executing a portion of a program that is related to the input, entering information into a portion of a content item based on the input (e.g., enter a password and login information into a field of a web page), shopping for an item based on the input, or any other interaction with a portion of a content item. In returning to the example above where the virtual assistant has identified flight it formation of an airline web page as being relevant to user input requesting a flight, the virtual assistant may display the flight information to the user in a legible manner without requiring the user to scroll, zoom, or otherwise navigate within the airline web page. Further, in the example where the virtual assistant has identified a particular input field of an airline web page as being relevant to user input requesting to check-in a user to a flight, the virtual assistant may input information of the user (e.g., a confirmation number) into the input field to check the user into the flight.

In some instances, by utilizing the content interaction techniques described herein a user may interact with a particular portion of a content item through use of a virtual assistant. This may enhance a user's experience in interacting with a virtual assistant to obtain relevant content and/or perform an action. In one example, by displaying a portion of a content item on a smart device in a manner that is adapted to the smart device, the user may view the portion without scrolling, zooming, or otherwise navigating within the content item. This may reduce an amount of time a user spends navigating within the content item.

This disclosure also describes techniques directed to transferring an interaction with a virtual assistant from a smart device to another smart device. In particular implementations, the techniques may provide a virtual assistant on a first smart device to facilitate an interaction with a user and, thereafter, transfer the virtual assistant to a second smart device to continue the interaction of the virtual assistant with the user. A virtual assistant may generally act as an interface between the end user and content stored locally or remotely. The transferring techniques described herein may enable the user to transition from using a first smart device to a second smart device in an uninterrupted manner that maintains a conversation or other interaction with the virtual assistant.

To transfer a virtual assistant, the virtual assistant may be provided on an initial smart device to interact with a user. The interaction may include receiving input from a user, performing an action (e.g., a task) related to the input, and/or outputting one or more responses. In some instances, the virtual assistant may also identify one or more pieces of context while interacting with the user, such as user preferences, a location of the user, a conversation history, social media information (e.g., a recent post of the user), and so on. The one or more pieces of context may be useful in formulating responses to the user.

After the virtual assistant and user have exchanged one or more communications, the virtual assistant may be transferred to another smart device. The transfer may be triggered by a variety of events. In one example, the transfer is triggered from a particular communication between the user and the virtual assistant, such as explicit user input requesting the transfer, an inference from a term or phrase that is used in the conversation, etc. In another example, the transfer is triggered when the user moves away from the initial smart device to another smart device (e.g., based on a location of the user relative to the devices). The virtual assistant may be transferred to the other smart device by displaying or otherwise outputting the virtual assistant on the other smart device. In some instances, one or more pieces of context of the interaction between the virtual assistant and the user may be maintained during the transfer. For example, if a user requests flight information on an initial smart device and thereafter transfers to another smart device, the request for flight information may be transferred to the other smart device so that the virtual assistant may respond to the request without asking the user to repeat information.

In some instances, by utilizing the virtual assistant transferring techniques described herein a user may transition from using an initial smart device to interact with the virtual assistant to utilizing another smart device. This may enhance the user's interaction with the virtual assistant by enabling the user to continue a conversation that is started on a particular device.

In many instances, the techniques described herein employ a virtual assistant provided through a client device. It should be appreciated that the virtual assistant may be implemented in whole, or in part, by the client device. In one example, the virtual assistant is implemented by a client application that operates in cooperation with a remote device, such as a cloud computing resource. Here, the client application may utilize the remote device to recognize speech, generate a response, and/or perform other operations described herein. Further, in other examples, the virtual assistant may operate independently from the remote device.

In general, a content item may include any type of content in an electronic format, such as a web page, a search result, a blog, an image, a video, audio, text, a book, a magazine, a newspaper, a journal, content of an application (e.g., page(s) of a mobile app, etc.), an interface element (e.g., buttons, icons, menus, etc.), a software module, an object (e.g., programming object), projected content, an instruction/program (e.g., an instruction to cause content to be output, a device to vibrate, a gesture or movement to be output through a device, etc.), and so on.

A content item, or any portion thereof, may include content that is stored locally on a device (e.g., content of a client application, a local copy of a media file, etc.), content that is stored remotely to a device (e.g., a web page), or any other content. As such, a content item, or a portion thereof, may be retrieved from a data store, a web service, an application, an agent (e.g., an airline agent), a data source for communications between agents (e.g., a communication between an airline agent and a banking agent, etc.), a data source for listening posts (e.g., a data source associated with an agent that reviews and/or responds to posts on a social networking site or blog), or any other type of content source. In one example, a content item is retrieved through the use of an Application Programming Interface (API). A content item may be composed of multiple smaller portions, such as images, lines of text, audio segments, interface elements, articles, chapters, sections, pages, tracks, episodes, parts, units, subdivisions, scenes, intervals, periods, and so forth.

This brief introduction is provided for the reader's convenience and is not intended to limit the scope of the claims, nor the proceeding sections. Furthermore, the techniques described in detail below may be implemented in a number of ways and in a number of contexts. One example implementation and context is provided with reference to the following figures, as described below in more detail. It is to be appreciated, however, that the following implementation and context is but one of many.

Example Architecture

FIG. 1 illustrates an example architecture 100 in which techniques described herein may be implemented. The architecture 100 includes a smart device 102 and a smart device 104 configured to interact with a user 106. The smart device 102 and/or smart device 104 may include any type of computing device that is generally configured to perform an operation. For example, the smart device 102 and/or smart device 104 may be implemented as a laptop computer, a desktop computer, a server, a smart phone, an electronic reader device, a mobile handset, a personal digital assistant (PDA), a portable navigation device, a portable gaming device, a tablet computer, a watch, a portable media player, a television, a set-top box, a computer system in a car, an appliance, a camera, a robot, a hologram system, a security system, a home-based computer system (e.g., intercom system, home media system, etc.), a projector, an automated teller machine (ATM), a pair of glass with computing capabilities, and so on.

In some instances described herein, the smart device 104 may have a characteristic that is different that a characteristic of the smart device 102. In one example, the smart device 104 has a different display characteristic than the smart device 102, such as a larger screen dimension, screen area, resolution, and so on. To illustrate, the smart device 104 may comprise a desktop computer having a screen size above 14 inches, while the smart device 102 may comprise a mobile device having a screen size below 14 inches. In another example, the smart device 104 is configured to output (e.g., display, render audio, project content, etc.) content of a different format than the smart device 102, such as content of a different storage type (e.g., codec type).

The smart device 102 and/or smart device 104 may each be equipped with one or more processors 108 and memory 110. The memory 110 may include a client application 112 (e.g., module) configured to interface with the user 106 and perform other functionality. For instance, the client application 112 may receive input from the user 106, cause the input to be processed at the device 102/104 or a remote device, and provide a response back to the user 106. The input may include audio or speech, text, touch, or gesture input received through a sensor of the device 102/104. In some instances, the response to the user 106 includes outputting a content item or a portion of the content item that is relevant to the user input (e.g., displaying or projecting content, rendering audio, controlling motion of a robot, etc.). To illustrate, in response to the user 106 requesting "How many bags can I check for free?," the client application 112 may display a particular portion of an airline web page that indicates that a first bag is free and a second bag costs $20.

In some implementations, the client application 112 is implemented as, or in conjunction with, a virtual assistant 114 (e.g., an intelligent personal assistant). A "virtual assistant" may generally act as an interface between end users and information of one or more service providers 116 (hereinafter the service provider 116), information of a device (e.g., the smart device 102/104), or any type of information. For example, in response to input from the user 106, the virtual assistant 114 may access content items stored on the service provider 116 and formulate a response to the user 106. In many instances described herein, the virtual assistant 114 operates in cooperation with a virtual assistant service 118. That is, one or more functions of the virtual assistant 114 may be performed by the virtual assistant service 118. Further, in some implementations the client application 112 is implemented as, or in association with, an application (e.g., mobile application), browser (e.g., mobile browser), and so on.

The virtual assistant service 118 may generally provide one or more services to implement the virtual assistant 114. The one or more services may include speech recognition, content item analysis, response formulation, content tagging, virtual assistant transfers, and so on. For instance, input received at the device 102/104 from a user may be sent to the virtual assistant service 118 to interpret the speech and formulate a response to the input. The response may include outputting content (e.g., outputting audio (an audible answer), video, an image, text, a hyperlink, etc.), performing an action related to content (e.g., logging a user into a site, navigating to a web site, upgrading a user's seat assignment, purchasing an item, etc.), and so on. In some instances, a response may be addressed to or otherwise tailored to a particular user (e.g., "Yes, John, as a Gold Customer you are entitled to a seat upgrade, and I have provided some links below that may be of interest to you . . . ."). After formulating a response, the virtual assistant service 118 may provide the response may to the device 102/104 to be output to a user and/or to cause the device 102/104 to perform an action. In some instances, the service 118 may also assist in transferring the virtual assistant 114 between smart devices. As such, the virtual assistant service 118 may operate as a "back-end" resource.

The virtual assistant service 118 may include one or more computing devices 120 (hereinafter the device 120). The device 120 may be implemented as one or more desktop computers, laptop computers, servers, and the like. The device 120 may be configured in a cluster, data center, cloud computing environment, or a combination thereof. In one example, the device 120 provides cloud computing resources, including computational resources, storage resources, and the like, that operate remotely to the smart device 102/104.

The device 120 may include one or more processors 122 and memory 124. The memory 124 may include software functionality configured as one or more "modules." The term "module" is intended to represent example divisions of the software for purposes of discussion, and is not intended to represent any type of requirement or required method, manner or necessary organization. Accordingly, while various "modules" are discussed, their functionality and/or similar functionality could be arranged differently (e.g., combined into a fewer number of modules, broken into a larger number of modules, etc.). As illustrated in FIG. 1, the device 120 includes a tagging module 126, a content identification module 128, a learning module 130, and a context module 132.

The tagging module 126 may be configured to create a tag to be associated with a portion of a content item. The tag may indicate a particular category or term that is related to the portion of the content item. Alternatively, or additionally, the tag may indicate a particular user input request that is related to the portion of the content item. A tag may be used by the virtual assistant service 118 to identify a portion of a content item that is relevant to user input. In one example, content of a content item, such as a web page, may not be legible on a smart device, due to a display characteristic of the device (e.g., relatively small display screen), without zooming in or otherwise navigating within the content item. In this example, in order to account for a display characteristic the smart device, different portions of a content item may be tagged so that a particular portion of the content item may be viewed on the smart device in portions in a legible manner.

In some instances, a tag is created through the assistance of one or more tagging users 134 (hereinafter the tagging user 134) associated with the virtual assistant service 118. The tagging user 134 may review previously received user input and tag a particular portion of a content item that is relevant to the user input. For example, for user input "Please find a flight from Spokane to Seattle," the tagging user 134 may view an airline web page that includes different types of flight information, and identify information that may be most relevant to the user input and that may be legible on a particular smart device. In this example, the tagging user 134 may create a tag of "flight information" to be associated with departure details on the web page. Thereafter, if a user requests flight information from Spokane to Seattle, the departure details may be selected for display. In the example architecture 100 of FIG. 1, the tagging user 134 has tagged a portion 136 of a web page by highlighting the portion 136.

Although the tagging user 134 is illustrated in FIG. 1 as being associated with the virtual assistant service 118, in some instances the tagging user 134 is an end user or other user that is not associated with the virtual assistant service 118. For example, the tagging user 134 may comprise the user 106 that may unknowingly create a tag by scrolling, zooming, or otherwise navigating to a portion of a web page. To illustrate, suppose that the user 106 has requested a time that the local mall closes and the virtual assistant 114 has returned the home page of the mall. If, for example, the closing time is located at the bottom of the home page in small print, the user 106 may scroll, zoom, or otherwise navigate to that location in order to find the information. Here, a tag may be created for the closing time information after the user 106 navigates to the bottom of the home page.

Alternatively, or additionally, a tag may be created through a machine analysis of a content item. For instance, the device 120 may parse a content item to determine information within the content item and create one or more tags identifying the information.

The content identification module 128 may be configured to identify a portion of a content item that satisfies user input. In some implementations, the portion may be identified by analyzing the content item to determine a portion of the content item that is relevant to the user input. For instance, a web page of a mall may be parsed to identify a portion of the web page that is most relevant to a request for a closing time of the mall. The analysis may be performed in real-time as a request is received from a user and/or may have been previously performed. Alternatively, or additionally, the content identification module 128 may identify a portion of a content item by determining a portion of the content item that is tagged as being relevant to a particular request, category, and/or term. For example, a response to a request for flight information may include a portion of a web page that is tagged as including flight information. In the example architecture 100 of FIG. 1, the content identification module 128 has identified a portion 138 of a content item 140 that is stored in a data store 142 (e.g., a data store of the service provider 116 or the virtual assistant service 118).

The learning module 130 may be configured to observe user activity and attempt to learn characteristics about the user. The learning module 130 may learn any number of characteristics about the user overtime, such as user preferences (e.g., likes and dislikes), track patterns (e.g., user normally reads the news starting with the sports, followed by the business section, followed by the world news), behaviors (e.g., listens to music in the morning and watches movies at night, speaks with an accent that might impact language models, prefers own music collection rather than looking for new music in the cloud, etc.), and so on. To observe user activity and learn a characteristic, the learning module 130 may access a user profile, track a pattern, monitor navigation of the user, and so on. Each of these learned characteristics may be useful to provide context that may be utilized to interpret input received from the user.

As an example of the learning, consider a scenario where a user incorrectly inputs "Cobo" or a speech recognition system incorrectly recognized the user input as "Cobo". Once the user corrects this to say "Cabo", the learning module 130 can record this correction from "Cobo" to "Cabo" in the event that a similar situation arises in the future. Thus, when the user next speaks the phrase "Cabo San Lucas", and even though the speech recognition might recognize the user input as "Cobo", the virtual assistant service 118 will use the learned correction and make a new assumption that the user means "Cabo" and respond accordingly. As another example, if the user routinely asks for the movie "Crazy", the learning module 130 will learn, over time, that this is the user preference and make this assumption. Hence, in the future, when the user says "Play Crazy", the virtual assistant service 118 will make a different initial assumption to begin play of the movie, rather than the original assumption of the song "Crazy" by Willie Nelson.

The context module 132 may be configured to identify one or more pieces of context of a conversation. The context module 132 may take into account a context in at least two different locations. First, the context module 132 may take into account the context associated with a query when determining an intent or meaning of the user's query. In addition, after identifying the user's intent with use of the context, the context module 132 may again take this context into account when determining a response or reply to provide back to the user. In some instances, the context module 132 may take the same pieces of context into account when identifying the intent and the response, while in other instances the techniques may take into account different pieces of context. By taking context into account in at least these locations, a response may be provided to a user that more closely emulates human-to-human interaction, in comparison to traditional techniques for identifying virtual assistant responses.

Generally, context of a conversation may comprise any type of information that aids in understanding the meaning of a query and/or in formulating a response. In some instances, a piece of context is expressed as a value of one or more variables, such as whether or not a user has signed in with a site (e.g., "is_signed_in=true" or "is_signed_in=false"). Example, non-limiting pieces of context ray include:

- past interaction information between the user and the virtual assistant, either during the current session or during previous sessions (e.g., a prior query provided by the user to the virtual assistant during a conversation session, a navigation history of the user during a conversation session prior to the user providing a query to the virtual assistant, etc.);
- a location of a cursor on a site when the user provides input to the virtual assistant;
- a time of day at which the user provides input to the virtual assistant;
- a date on which the user provides input to the virtual assistant;
- an age of the user;
- a location of the user (e.g., a geolocation of the user associated with the device through which the user provides the query, location based on network information, address of the user, etc.);
- a device type from which the user interacts with the virtual assistant (e.g., a mobile device, a desktop computer, game system, etc.);

a communication channel which a device of the user uses to interface with the virtual assistant service (e.g., wireless network, wired network, etc.);

a language associated with the us (e.g., a language of a query submitted by the user);

how the user interacts with the virtual assistant (e.g., input mode—whether the user submits a query textually, using voice input, gesture, etc.);

how the interaction with the virtual assistant is initiated (e.g., via user selection of a link or graphic, via the virtual assistant proactively engaging the user, etc.);

how the user has been communicating recently (e.g., via text messaging, via email, etc.);

information derived from the user's location (e.g., current, forecasted, or past weather at the location, major sports teams at the location, nearby restaurants, etc.);

current topics of interest, either to the user or generally (e.g., trending micro-blog or blog topics, current news, recent micro-blog or blog posts made by the user, etc.);

whether or not the user has signed in with a site of a service provider (e.g., with a user name and password);

a status of the user with a service provider (e.g., based on miles flown, a type of membership of the user, a type of subscription purchased by the user, etc.);

a page of a site from which the user provides a query to the virtual assistant;

how long the user has remained on a page of a site from which the user provides a query to the virtual assistant;

social media information (e.g., posts or other content posted to a social networking site or blog);

user preferences (e.g., likes and dislikes);

any characteristic of a user.

Figure 3:
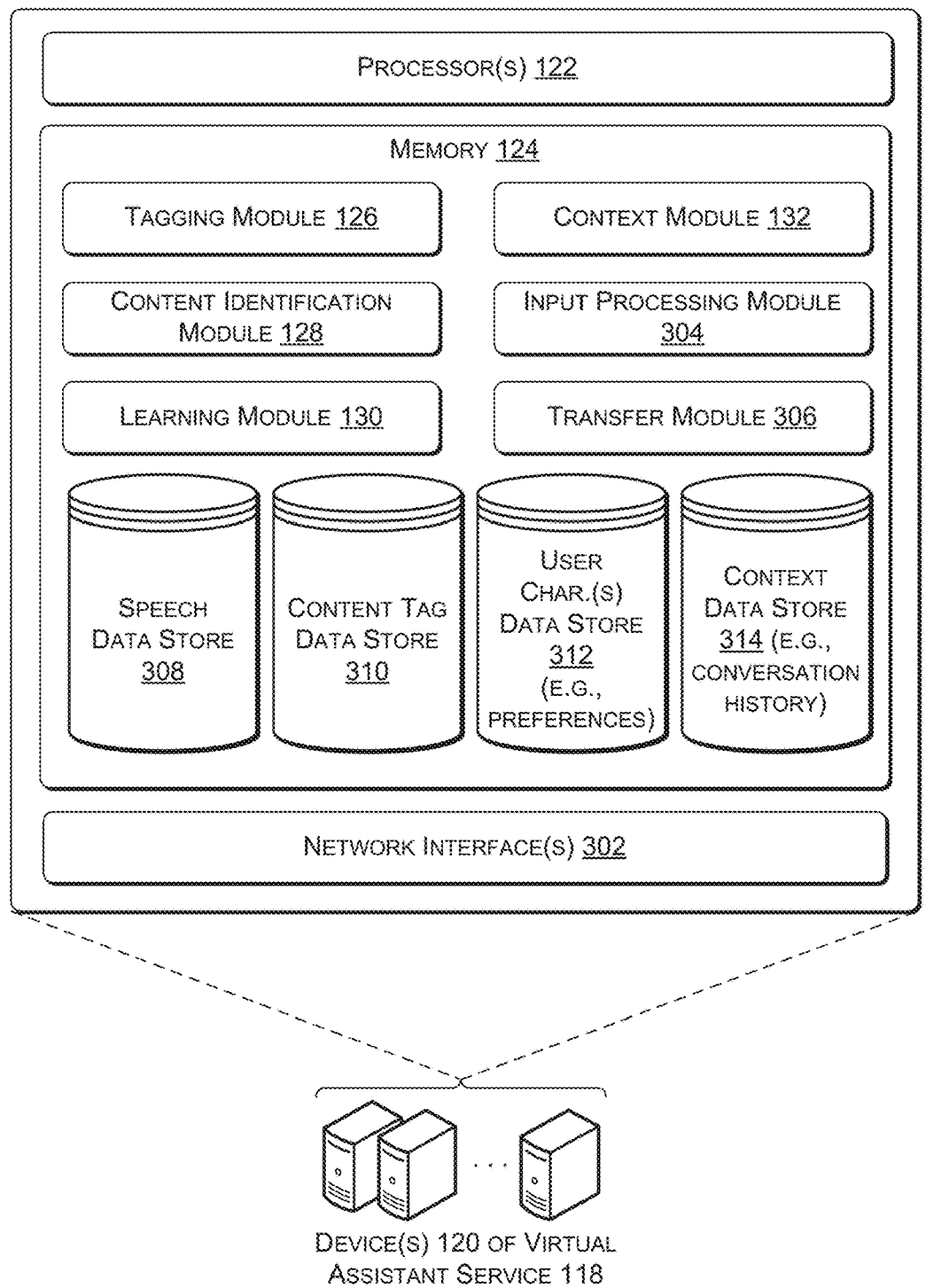
FIG. 3 illustrates further details of the example device of the virtual assistant service of FIG. 1.

Although the modules 126-132, as well as other modules of the device 120 discussed in reference to FIG. 3, are illustrated as being included in the device 120, in some instances one or more of these modules may be included in the smart device 102, the smart device 104, or elsewhere. As such, in some examples the virtual assistant service 118 may be eliminated entirely, such as in the case when all processing is performed locally at the smart device 102 and/or the smart device 104.

The memory 110 and 124 (as well as all other memory described herein) may include one or a combination of computer readable storage media. Computer storage media includes volatile and non-volatile, removable and non-removable media implemented in any method or technology for storage of information, such as computer readable instructions, data structures, program modules, or other data. Computer storage media includes, but is not limited to, phase change memory (PRAM), static random-access memory (SRAM), dynamic random-access memory (DRAM), other types of random access memory (RAM), read-only memory (ROM), electrically erasable programmable read-only memory (EEPROM), flash memory or other memory technology, compact disk read-only memory (CD-ROM), digital versatile disks (DVD) or other optical storage, magnetic cassettes, magnetic tape, magnetic disk storage or other magnetic storage devices, or any other non-transmission medium that can be used to store information for access by a computing device. As defined herein, computer storage media does not include communication media, such as modulated data signals and carrier waves. As such, computer storage media includes non-transitory media.

The service provider 116 may include one or more data stores 144 for storing content items. For example, the service provider 116 may include a mobile web data store, a smart web data store, an information and content data store, a content management service (CMS) data store, and so on. A mobile web data store may store content items that are designed to be viewed on a mobile device, such as a mobile telephone, tablet device, etc. Meanwhile, a web data store includes content items that are generally designed to be viewed on a device that includes a relatively large display, such as a desktop computer. An information and content data store may include content items associated with an application, content items from a data base, and so on. A CMS data store may include content items providing information about a user, such as a user preference (e.g., a seat preference, a home airport, a preference of whether schedule or price is important to a user, a type of weather a user enjoys, types of items acquired by a user and identifying information for those items, types of stock a user owns or sold etc.), user profile information (e.g., information identifying friends/family of a user, information identifying where a user works or lives, information identifying a car a user owns, etc.), information identifying offers that are configured to a user based on profile and purchase preferences, etc. The information about the user may influence how an agent may interact with the user. As such, the service provider 116 may include content items from any type of source. Although the one or more data stores 144 are illustrated as included in the service provider 116, the one or more data stores 144 may alternatively, or additionally, be included in the virtual assistant service 118, the smart device 102, and/or the smart device 104.

The architecture 100 may also include one or more networks 146 to enable the smart device 102, smart device 104, virtual assistant service 118, and/or service provider 116 to communicate with each other. The network 146 may include any one or combination of multiple different types of networks, such as cellular networks, wireless networks, Local Area Networks (LANs), Wide Area Networks (WANs), and the Internet.

In one non-limiting example of the content interaction techniques within the architecture 100, Joe may act as the user 106 operating his cell phone (e.g., the smart device 102) to book a flight from Spokane to Seattle. Joe initiates the interaction with the virtual assistant 114 by verbally requesting "Please find a flight from Spokane to Seattle on April 4," and the device 102 sends the speech input to the virtual assistant service 118 for processing. At the virtual assistant service 118, speech recognition is performed to determine a meaning of the speech input. Upon determining that that Joe is looking for flight information, the service 118 processes a web page 148 of flight information for flights from Spokane to Seattle on April 4 to find a portion 150 of the web page 148 that best answers Joe's request. Here, the web page 148 includes advertisements, baggage details, departure times, and flight pricing details. The service 118 identifies the departure times and pricing details (the portion 150) as being tagged as "flight information" and sends information to the smart device 102 to cause this information to be displayed. The virtual assistant 114 presents the portion 150 on Joe's cell phone, enabling Joe to legibly view the departure times and pricing details. By doing so, Joe is able to book a flight from Spokane to Seattle.

Further, in one non-limiting example of the virtual assistant transfer techniques within the architecture 100, Joe may act as the user 106 operating his desktop comp (e.g., the smart device 104) to book a flight from Spokane to Seattle. Joe navigates to the web page 148 in order to view content of the service provider 116 that includes flight information. While at the web page 148, Joe selects an icon for the virtual assistant 114 and inputs a request for flight information from Spokane to Seattle on April 4 through a conversation interface (not illustrated in FIG. 1). The request is sent to the virtual assistant service 118 for processing. Upon entering the request, Joe realizes that he needs to travel away from the desktop computer. Joe selects a button 152 that causes the virtual assistant 114 (including the conversation interface and conversation history) to transfer to his cell phone (the smart device 102). After finding a response to Joe's input, namely the portion 150 of the web page 148, the virtual assistant service 118 causes the portion 150 to be displayed on Joe's cell phone, which is now hosting the virtual assistant 114. Joe views the flight information on his phone and books a flight.

Example Device(s)

Figure 2:
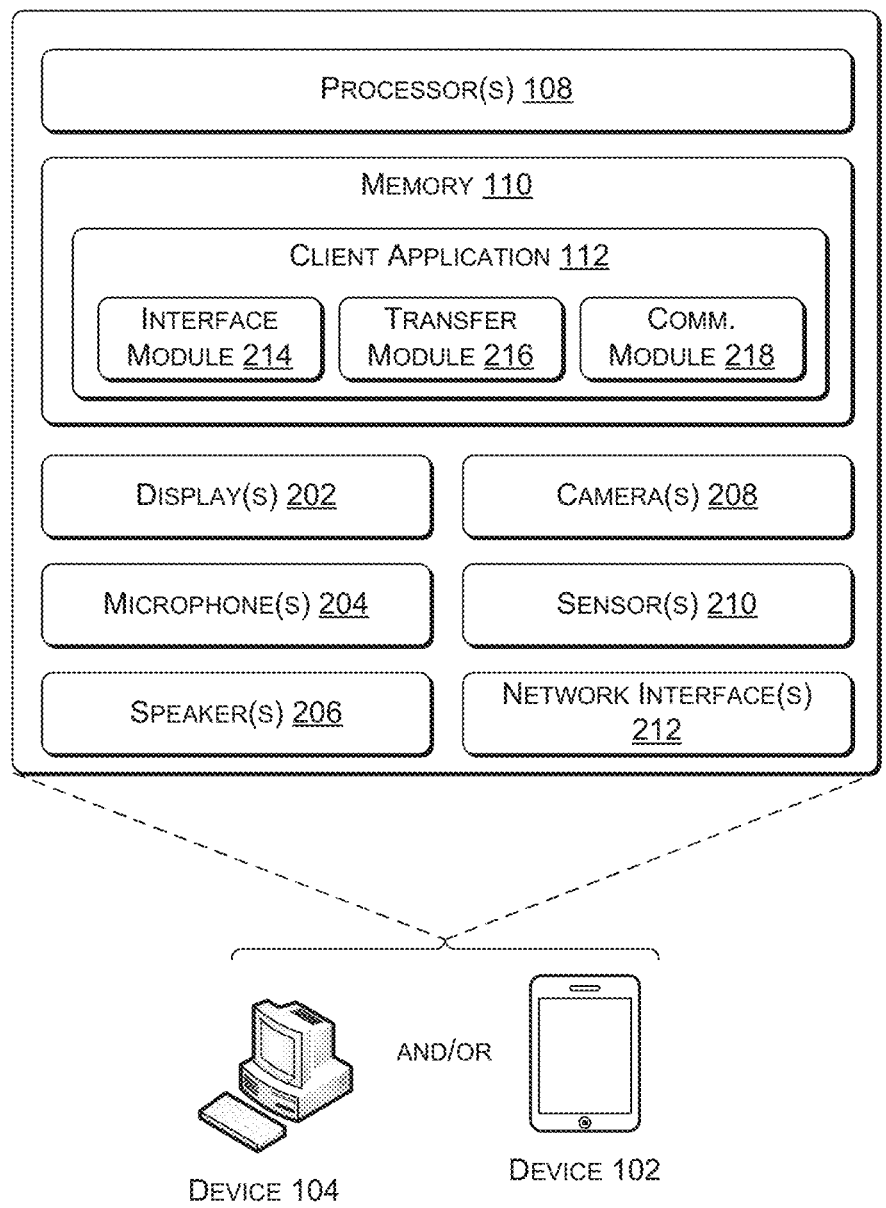
FIG. 2 illustrates further details of an example smart device of FIG. 1.

FIG. 2 illustrates further details of the example smart device 102/104 of FIG. 1. As noted above, the device 102/104 may generally interact with a user to receive input and provide responses to the input, such as a portion of a content item. In some instances, the device 102/104 may operate independently (e.g., perform processing locally), while in other instances the device 102/104 may operate in cooperation with a remote device, such as the virtual assistant service 118.

The smart device 102 and/or smart device 104 may each include the one or more processors 108, the memory 110, one or more displays 202, one or more microphones 204, one or more speakers 206, one or more cameras 208, one or more sensors 210, and one or more network interfaces 212. The one or more sensors 210 may include an accelerometer, compass, gyroscope, magnetometer, Global Positioning System (GPS), olfactory sensor (e.g., for smell), or other sensor. In some instances, the one or more displays 202 are implemented as one or more touch screens. The one or more cameras 208 may include a front facing camera and/or a rear facing camera. The one or more displays 202, microphones 204, speakers 206, cameras 208, and/or sensors 210 may be configured to receive user input, such as gesture input (e.g., through the camera), touch input, audio or speech input, and so on, and/or to output content, such as audio, images, video, and so on.

As noted above, the memory 110 may include the client application 112 (e.g., module) configured to interface with a user. In general, the client application 112 may utilize a virtual assistant to interact with a user on the smart device 102 and/or the smart device 104. To implement the virtual assistant, the client application 112 may include an interface module 214, a transfer module 216, and a communication module 218.

The interlace module 214 may be configured to facilitate interaction with a user. In some instances, the interface module 214 utilizes the virtual assistant 114, which may solicit input from the user, provide responses to the user, and so on. The virtual assistant 114 may include a conversation user interface (e.g., a text box) that allows users to input audio or speech, text, touch, or gesture queries, such as "find the nearest restaurant" or "when does the mall close?". In response to such a query, the virtual assistant 114 may attempt to identify content items of the service provider 116, content items stored locally, or other content items that may be relevant to the input. The identified content items may be used to formulate a response to the user. The response may include outputting the content item or a portion of the content item, such as a portion of a web site of the nearest restaurant, and/or outputting an audible or visual response, such as "the mall closes at 9 PM." In some instances, the conversation user interface includes one or more dialog representations to solicit input from a user, provide a response to the user, provide input of the user, and so on. The virtual assistant 114 may be implemented through browser, application (e.g., client or remote), and/or as part of an operating system.

Although the interface of the virtual assistant 114 has been described as being associated with the device 102/104, in other examples the interface is associated with the service provider 116 and/or the virtual assistant service 118. In one instance, the interface is displayed through an online site of the service provider 116, such as when the user navigates to the online site. Here, the interface may include a virtual assistant that embodies characteristics of the service provider 116, such as a flight attendant for an online airline site.

In some instances, the virtual assistant 114 may embody a human-like persona. For example, the virtual assistant 114 may be represented by an image or avatar that is displayed on the smart device 102. An avatar may comprise an animated character that may take on any number of shapes and appearances, and/or resemble a human talking to a user. In some instances, the avatar may be arranged as a representative of the service provider 116, while in other instances the avatar may be a dedicated personal assistant to a user.

The transfer module 216 may cause a virtual assistant provided on one device to be transferred to one or more other devices. That is, the module 216 may enable a virtual assistant that is displayed on one device to be displayed on another device such that interaction with the virtual assistant is not interrupted. In one example, a local copy of the transfer module 216 operating on the smart 104 may cause a virtual assistant output through the smart device 104 to be transferred to the smart device 102. This transfer may be performed with the assistance of a local copy of the transfer module 216 operating on the smart device 102 and/or with the assistance of the virtual assistant service 118. When transferring a virtual assistant, the context of the conversation may also be transferred so that the conversation may continue with previously identified information that may be relevant to the conversation. In some instances, a virtual assistant may be transferred from one smart device to multiple smart devices. Further, in some instances, the virtual assistant may be transferred back to an initial device after being transferred from the initial device.

The communication module 218 may be configured to communicate with the virtual assistant service 118 and/or service provider 116. For example, the module 218 may send input to the virtual assistant service 118, receive a response from the service 118 that identifies content to be displayed, and obtain the content from the service provider 116. In some instances, by communicating with the service 118, the device 102/104 may identify a content item or portion of a content item that may be presented as a response to user input.

Example Virtual Assistant Service

FIG. 3 illustrates further details of the example device 120 of the virtual assistant service 118 of FIG. 1. As noted above, the virtual assistant service 118 may generally provide one or more services to implement the virtual assistant 114 on the smart device 102 and/or the smart device 104.

The device 120 may include the one or more processors 122, the memory 124, and one or more network interfaces 302. The memory 124 may store the tagging module 126, the content identification module 128, the learning module 130, the context module 132, an input processing module 304, a transfer module 306, a speech data store 308, a content tag data store 310, a user characteristic(s) data store 312, and a context data store 314.

As noted above, the tagging module 126 may be configured to create a tag to be associated with a portion of a content item. In some instances, the module 126 may send user input and a content item to the tagging user 134 to solicit feedback from the tagging user 134. The tagging user 134 may reference the user input and view the content item to provide content identification input identifying a portion of the content item that is relevant to the user input. The tagging user 134 may provide the content identification input by selecting (e.g., highlighting, circling, enclosing, etc.) a displayed area of the content item and/or by providing other information (e.g., text or speech feedback identifying the portion). The tagging module 126 may utilize the content identification input to generate a tag (e.g., metadata). The tag may indicate that the portion of the content item is associated with a particular category/term and/or that the portion is relevant to particular user input. The tag may be stored in the content tag data store 310 in relation to the portion of the content item and/or the user input. Alternatively, or additionally, the tagging module 126 may tag a portion of a content item based on an analysis of the content item. Here, the module 126 may parse or otherwise process the content item to understand content of the content item and create a tag based on the content.

In some instances, a tag may indicate a degree of relevance to particular user input. To illustrate, a web page of an airline that includes multiple types of flight information, such as baggage checking details, fair refund policies, and departure times, may be tagged with tags of vary degree of relevance to user input. If, for instance, the user input requests "Please find a flight from Spokane to Seattle," the fair refund policies may be tagged as the least relevant to the user input, the baggage checking details may be tagged as the next most relevant, and the departure times may be tagged as the most relevant.

As noted above, the content identification module 128 may be configured to identify a portion of a content item that satisfies user input. In some implementations, the portion may be identified by analyzing the content item in real-time, while in other implementations the portion may be identified by searching through tagged portions of content items. In either case, the module 128 may find a portion of a content item that is relevant to user input and utilize the portion of the content item to perform an action, such as causing that portion to be sent to the device 102/104 for output, performing a task (e.g., logging into a site), and so on. In some instances, the module 128 may notify the device 102/104 of a portion to request from the service provider 116 and/or instruct the service provider 116 to send the portion to the device 102/104.

In some instances, a portion of a content item that is to be output on the device 102/104 is processed or otherwise reformatted to convert the portion into a format that is able to be output on the device 102/104. In one example, a portion of a content item that is to be displayed on the smart device 102 is reformatted to a format that is legible on the device 102 at a particular legibility level (e.g., converted to a mobile format). Meanwhile, in other instances a portion of a content item may be displayed on the device 102/104 without reformatting the content.

As noted above, the learning module 130 may observe user activity and attempt to learn characteristics about the user, such as user preferences, track patterns, behaviors, and so on. The characteristics of the user may be stored in the user characteristic data store 312. Meanwhile, the context module 132 may identify one or more pieces of context of a conversation, such as conversation history, location of a user, device type, etc. The one or more pieces of context may be stored in the context data store 314.

The input processing module 304 may perform various techniques to process input received from a user. If, for example, the input is speech input, the module 304 may perform speech recognition techniques to convert the input into a format that is understandable by a computing device. The speech input may be stored in the speech data store 308. Additionally, or alternatively, the module 304 may utilize Natural Language Processing (NPL) to interpret or derive a meaning and/or concept of the input. The speech recognition and/or NPL techniques may include known or new techniques.

The transfer module 306 may be configured to cause a virtual assistant displayed on one device to be transferred to another device. For example, the module 306 may cause a virtual assistant, and a corresponding conversation interface and context of the conversation, to move from being displayed on the smart device 104 to being displayed on the smart device 102. Here, the module 306 may perform the transfer by ceasing to implement the virtual assistant on the smart device 104 and initiating the virtual assistant on the smart device 102.

Example Navigation to a Portion of a Content Item

Figure 4:
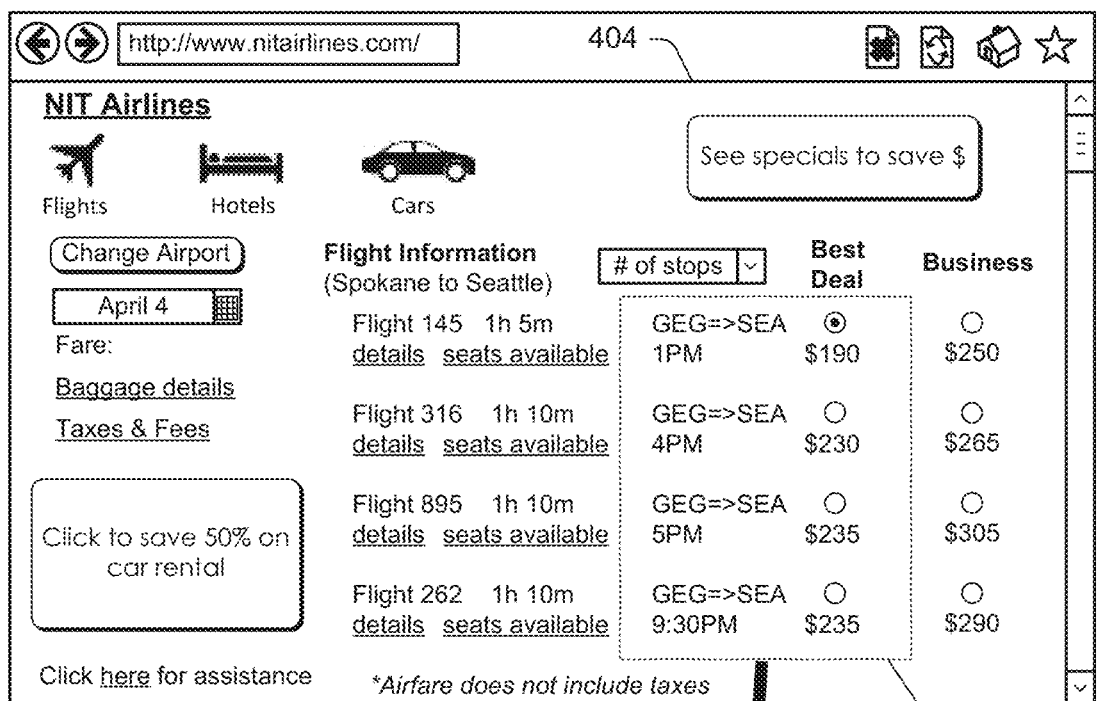
FIG. 4 illustrates example content of a content item that may be displayed on a smart device in response to user input.
Figure 4:
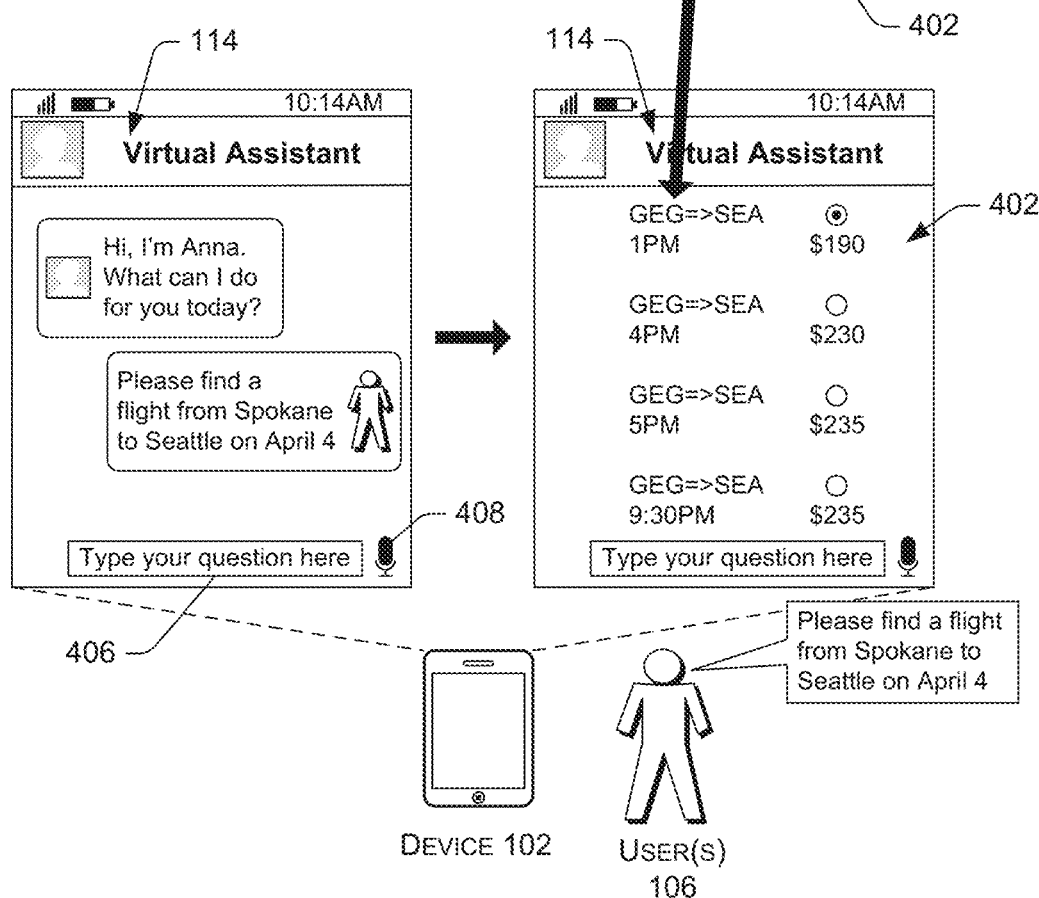

FIG. 4 illustrates example content 402 of a content item 404 that may be displayed on the smart device 102 in response to user input. In particular, the content 402 may include a portion of the content item 404 that is identified as being relevant to input received from the user 106 at the device 102. In this example, the content item 404 comprises a single web page of an airline, in particular, a page that provides flight information from Spokane to Seattle. However, it should be appreciated that the content item 404 may comprise any type of content, such as content from an application, content from a data base, content from a content management service, and so on.

As illustrated in FIG. 4, the user 106 interacts with the virtual assistant 114 on the smart device 102 to request content of the service provider 116, content stored locally on the device 102, and/or other content. Through a text input box 406 and/or microphone icon 408 the user provides input. The input may be a command, a statement, a query, an answer, and the like. A query may comprise a question (e.g., "Can I upgrade my seat assignment on my next flight?") or may simply comprise one or more keywords or a phrase (e.g., "seat assignment upgrades"). Here, the user input comprises speech input requesting "Please find a flight from Spokane to Seattle on April 4." In this example, the device 102 sends the input to the virtual assistant service 118.

At the virtual assistant service 118, one or more content items, or information associated with the content items (e.g., tags), are analyzed to identify content that satisfies the user input. For example, the service 118 may perform a real-time analysis of the content item 404 to understand content of the content item 404 and/or may reference tags associated with the content item 404. In some instances, the service 118 may perform the analysis based on characteristics of the smart device 102, such as a screen resolution of the device 102 (e.g., 1024×768, 326 pixels per inch (PPI), etc.), a screen dimension of the device 102 (e.g., 4.2 inch display), a make/type/model of the device 102, or other information. The characteristics may be provided to the service 118 with the user input and/or may be previously known by the service 118 (e.g., based on previous user input, specifications stored in a database, etc.). The characteristics may enable the service 118 to find a portion of the content item 404 that may be output displayed) on the device 102 in a format that is adapted to the characteristics of the device 102.

In this example, the service 118 has identified the content 402 of the content item 404 as satisfying the user input. The content 402 includes departure times and pricing details, as well as radio controls to select a flight. Upon identifying the content 402, information may be sent to the smart device 102 to cause the device 102 to display the content 402. The content 402 and/or content item 404 may be provided to the device 102 from the service provider 116 and/or the virtual assistant service 118. At the device 102, the content 402 may be displayed without displaying the entire content item 404. That is, the virtual assistant 114 may navigate directly to the portion 402. By doing so, the user 106 may view content that is relevant to the user input in a legible manner.

Figure 5:
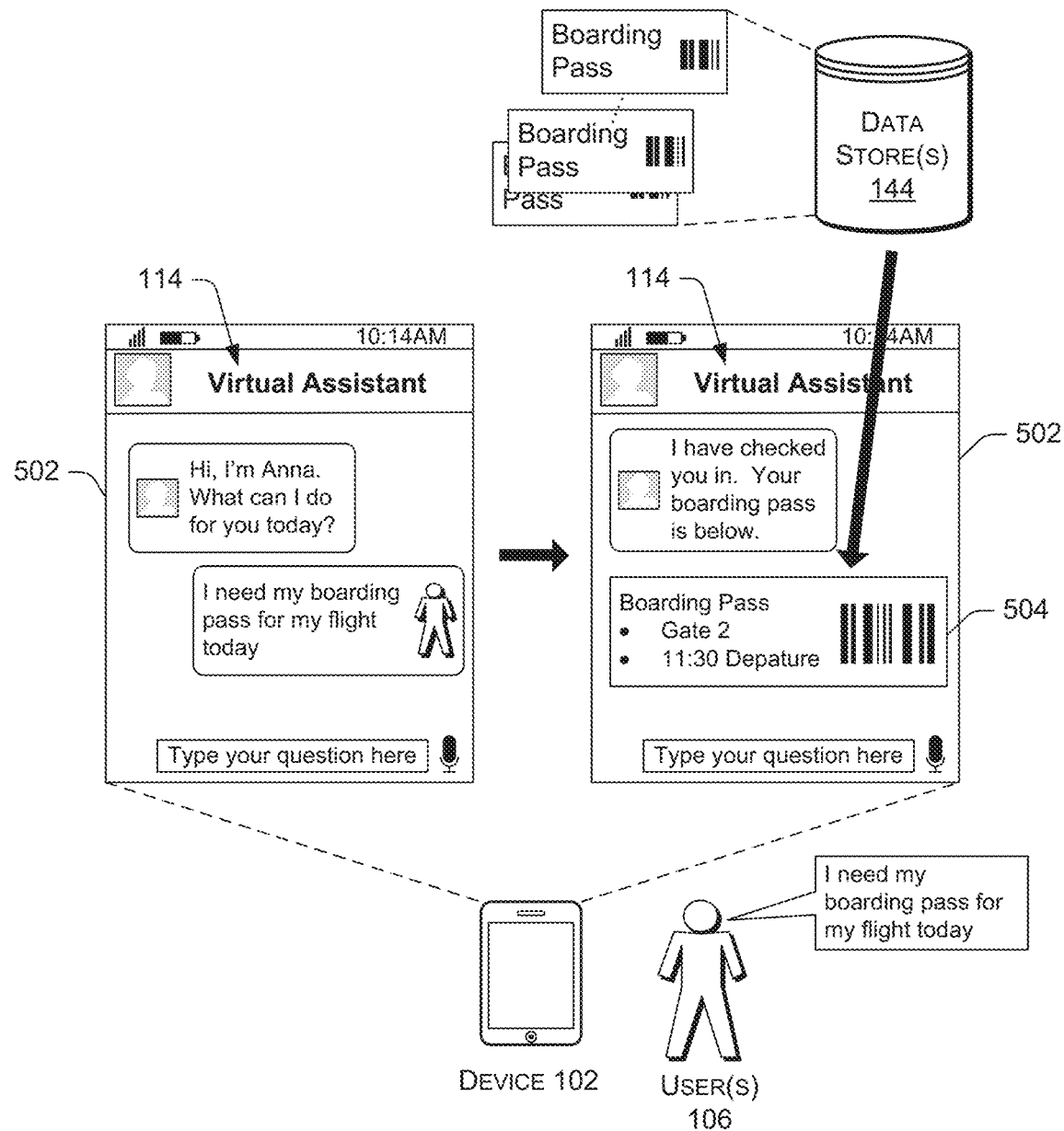
FIG. 5 illustrates example content that may be provided to a user through an interface associated with a virtual assistant.

FIG. 5 illustrates example content that may be provided to the user 106 through an interface 502 associated with the virtual assistant 114. In this example, the user 106 has interacted with the virtual assistant 114 to request a boarding pass 504 for a flight. In response to the request, the virtual assistant 114 has identified a portion of an airline web site that is utilized to check-in a user and has checked-in the user 106 by providing the appropriate information (e.g., a confirmation number, flight number, etc.). In addition, the virtual assistant 114 has retrieved the boarding pass 504 from the data store 144, which in this example is associated with an airline. As illustrated in FIG. 5, the boarding pass 504 is provided for display within the interface 502 so that the user 106 may view details of the boarding pass 504 in a convenient manner. In some instances, an icon that is linked to the boarding pass 504 may be displayed instead of the boarding pass 504. By selecting the icon, the boarding pass 504 may be displayed in the same conversation interface or in a different window. If another window is provided, the window may also include means for returning to the conversation interface, such as a back button.

Example Content Tagging

Figure 6A:
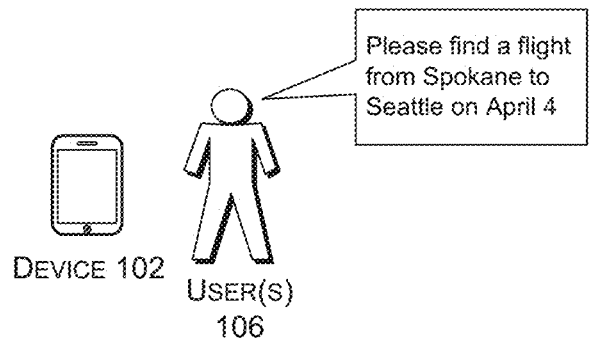
FIGS. 6A-6B illustrate example content tagging techniques to tag content of a content item that is relevant to user input.
Figure 6A:
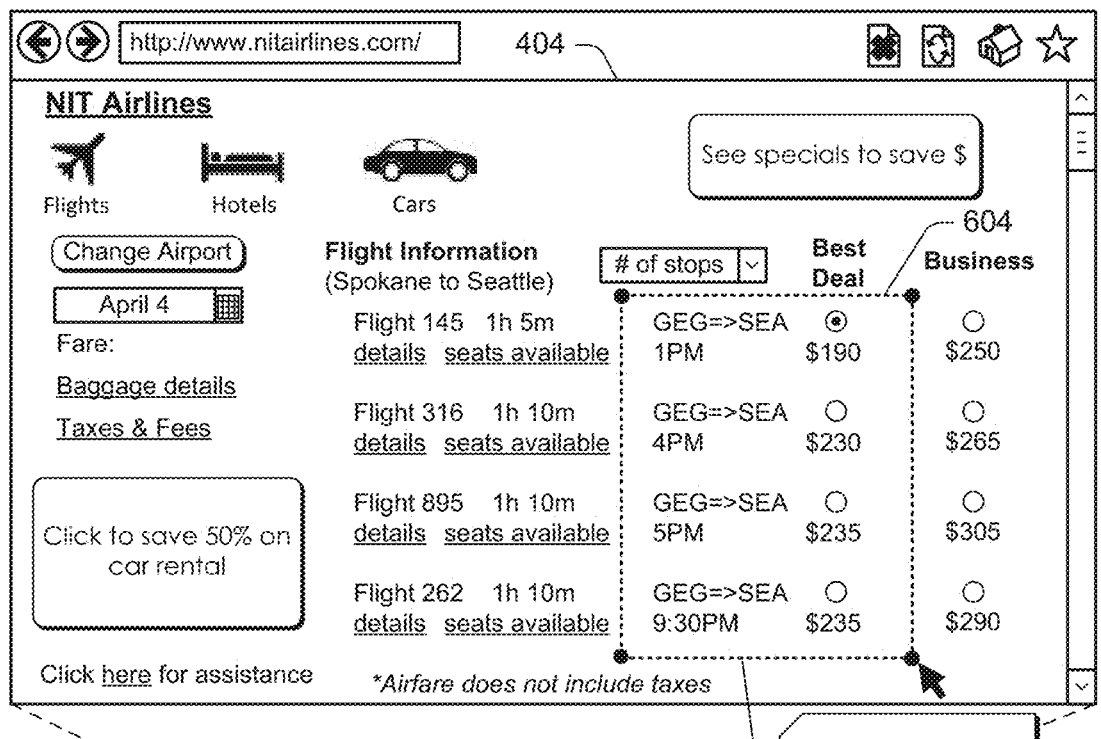
Figure 6B:
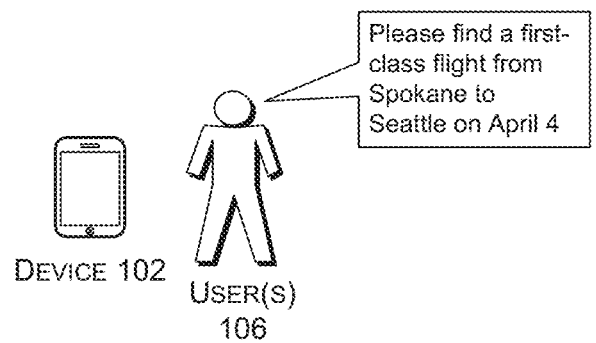
Figure 6B:
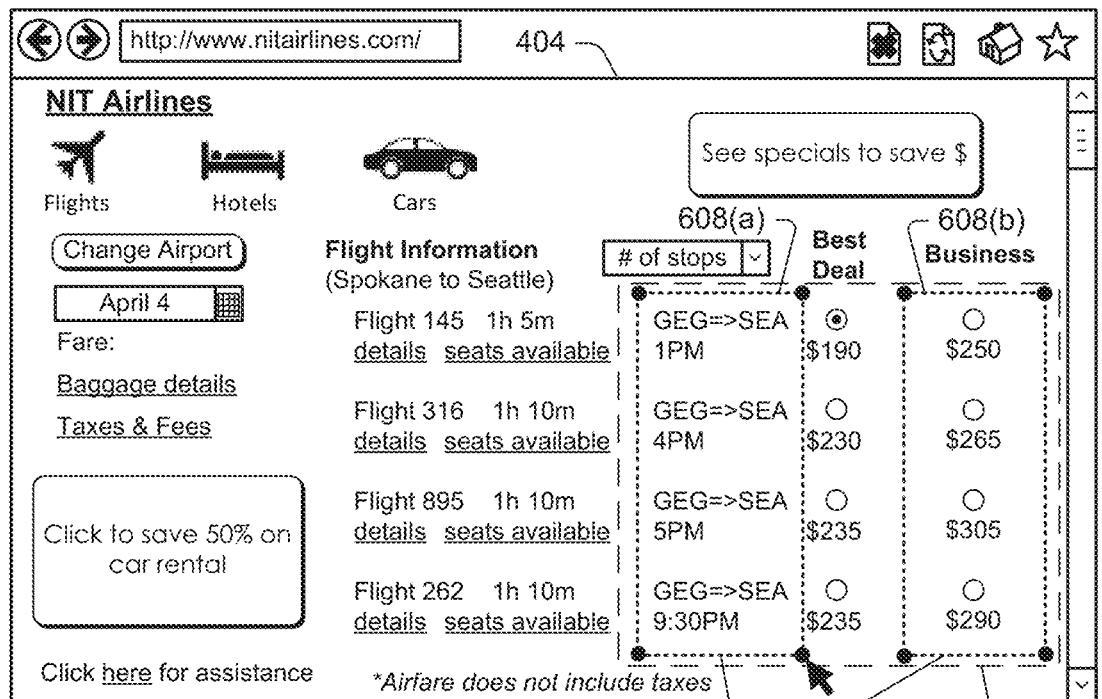
Figure 6B:
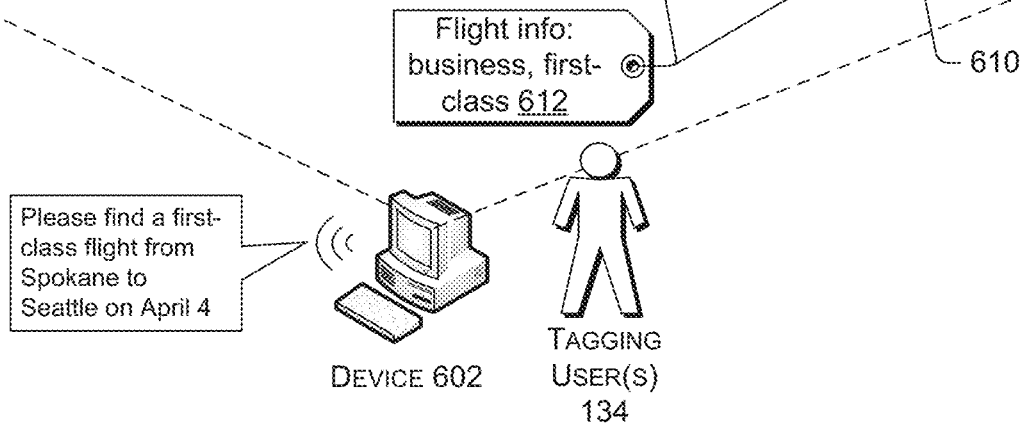

FIGS. 6A-6B illustrate example content tagging to tag content of a content item that is relevant to user input. In the examples of FIGS. 6A-6B, the tagging user 134 of the virtual assistant service 118 performs the tagging. However, it should be appreciated that any individual may perform such tagging, such as the user 106, a user associated with the service provider 116, or another user.

FIG. 6A illustrates the tagging user 134 utilizing a smart device 602 to tag a portion 604 of the content item 404. In this example, the smart device 602 comprises a laptop computer, a desktop computer, and the like. Further, in this example, the smart device 602 may include a display that is greater than a particular value to enable the user 134 to view content items that are designed to be viewed on a display that has a particular dimension. Here, the smart device 602 outputs user input requesting "Please find a flight from Spokane to Seattle on April 4" that is previously received from the user 106 at the smart device 102. The user input may be output to the tagging user 134 through speakers of the device 602, a display, or otherwise. Here, the device 602 audibly outputs the user input.

While the user input is output to the tagging user 134, the content item 404 may be displayed to enable the user 134 to select a portion of the content item 404 that is relevant to the user input. The content item 404 may have been selected to be output based on a general understanding of what the user input is requesting. Upon displaying the content item 404, the user 134 may select content that he/she believes is relevant to the user input. In this example, the user 134 has selected the portion 604 including departure times and pricing details. The selected portion 604 may then be tagged by the user 134 to be associated with a category, term, the user input, or other information. In the example of FIG. 6A, the tagging user 134 selects the portion 604 and right clicks to create a tag of flight information 606 for the portion 604.

In some instances, the smart device 602 may control tagging of content based on a display characteristic of the smart device 102. For instance, the device 602 may restrict selection of content such that the tagging user 134 may only select a portion of the content item 404 that will be viewable on the smart device 102 in a legible manner (e.g., at a particular legibility level). That is, the tagging user 134 may only select an area that is the same or smaller than a display area of the smart device 102. Alternatively, or additionally, the smart device 602 may display or otherwise output a display characteristic of the smart device 102 so that the user may generally know how much area may be selected and tagged.

Meanwhile, in other instances the smart device 602 may not control tagging of content based on a display characteristic of the smart device 102. Here, the device 602 may allow the user 134 to select any area of the content item 404. If, for example, the selected portion is identified to be output to the user 106 as a response, and the portion is too large to be displayed on the smart device 102 in a legible manner, the portion may be reformatted for display on the device 102 (e.g., change a size of images, text, etc.).

FIG. 6B illustrates the tagging user 134 utilizing the smart device 602 to tag multiple portions 608(*a*)-(*b*) of the content item 404 to be output as a single piece of content. In this example, the user 106 has requested "Please find a first-class flight from Spokane to Seattle on April 4" at the smart device 102. Thereafter, at the smart device 602, the user input is output to the tagging user 134 to solicit feedback from the tagging user 134. The tagging user 134 may identify the departure times as relevant to the user input. Further, since the example of FIG. 6B requests "first-class" flight information, the tagging user 134 may identify the pricing details in the "Business" category as relevant to the user input (e.g., "Business" pricing details are more relevant to "first-class" information than "Best Deal" pricing details). However, because a continuous area 610 comprising the departure times and the pricing details in the "Business" category may not be viewable on the smart device 102 in a legible manner, the tagging user 134 may select two portions, namely the portions 608(*a*)-(*b*), to be tagged as a single piece of content. Here, the tagging user 134 may tag the portions 608(*a*)-(*b*) to be associated with a tag 612 of "first-class" or "business" flight information. Thereafter, in response to a request for "first-class" or "business" flight information, the portions 608(*a*)-(*b*) may be provided as a single piece of content that may be legible on the smart device 102. In some instances, the portions 608(*a*)-(*b*) may be reformatted for display.

Example Virtual Assistant Transfer

Figure 7:
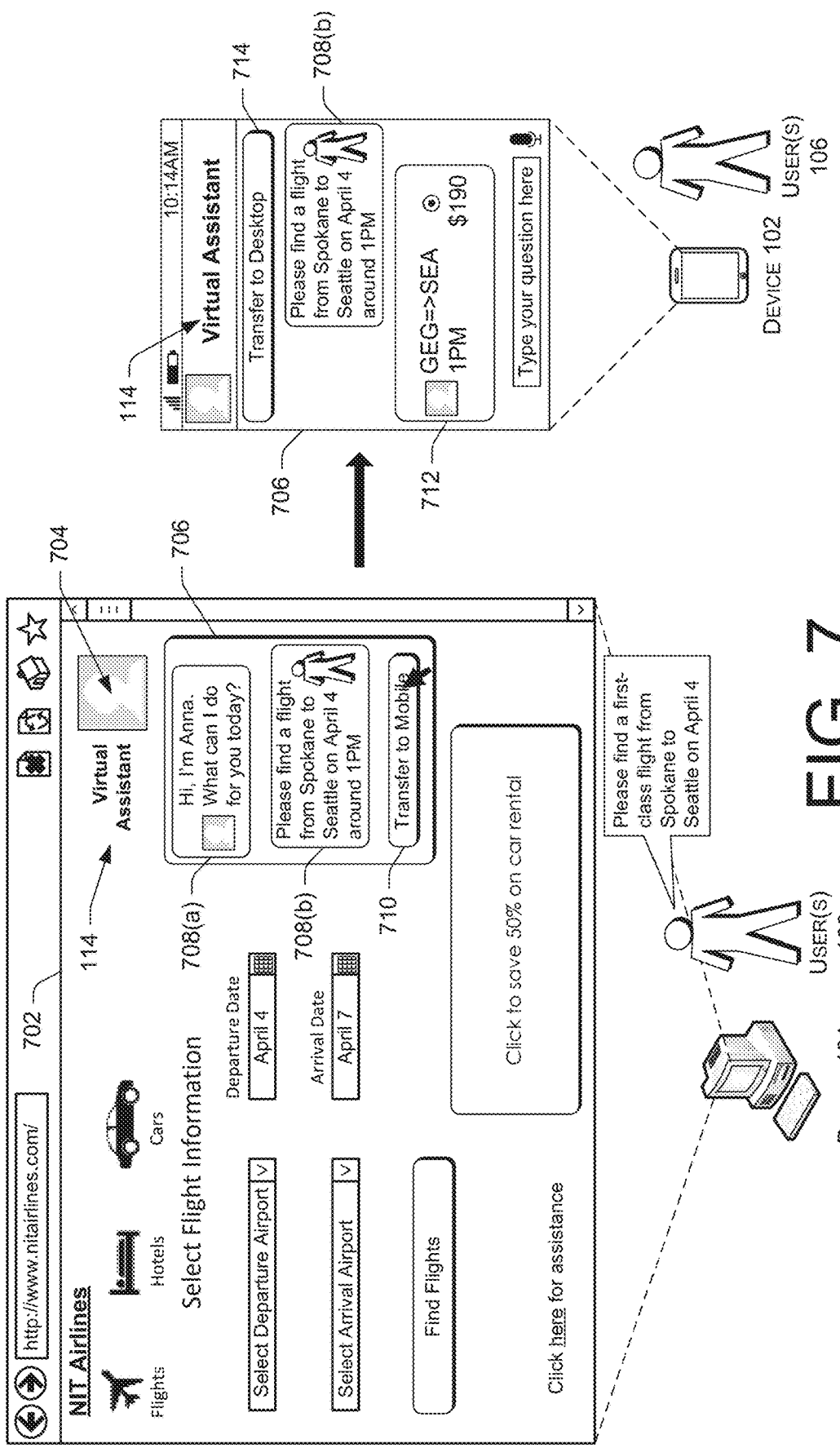
FIG. 7 illustrates an example process to transfer a virtual assistant interaction from a smart device associated with a user to another smart device associated with the user.

FIG. 7 illustrates an example process to transfer a virtual assistant interaction from the smart device 104 associated with the user 106 to the smart device 102 associated with the user 106. In this example, the user 106 navigates to a web page 702 of an airline site that includes flight information. As illustrated, the web page 702 includes an icon 704 to enable an interaction with the virtual assistant 114. Upon selecting the icon 704, a conversation user interface 706 is presented in an overlaid manner on the web page 702. Here, the interface 706 includes dialog representations 708(*a*)-(*b*) of the interaction between the user 106 and the virtual assistant 114. For example, the dialog representation 708(*a*) displays a message from the virtual assistant 114, while the dialog representation 708(*b*) displays input from the user 106.

As illustrated in the example of FIG. 7, the interface 706 includes an interface element 710 (e.g., button) to enable the user 106 to transfer the virtual assistant 114 to the smart device 102. In this example, the user 106 has selected the interface element 710 after providing the input "Please find a flight from Spokane to Seattle on April 4 around 1 PM." In some instances, upon selecting the element 710, the user 106 may input information identifying, a device to which to transfer the virtual assistant 114. The information may include, for example, a telephone number, wireless access code, device ID, or other information. In other instances, the virtual assistant 114 may identify devices to transfer the virtual assistant 114 to based on devices that are associated with the user 106 (e.g., previous devices that the user 106 has used), such as a previously used device that is within a predetermined proximity to the user 106.

To transfer the virtual assistant 114 from the smart device 104 to the smart device 102, the virtual assistant 114 may cease communications with the user 106 on the smart device 104 (e.g., cease displaying the conversation user interface 706). Thereafter, the virtual assistant 114, including the user interface 706, may be provided on the smart device 102 to continue the interaction of the virtual assistant 114 with the user 106.

In some instances, one or more pieces of context may also be transferred to the device 102, such as the dialog representation 708(*a*) (as illustrated), the user's age, user preferences, etc. This may enable the conversation to continue with an understanding of what has happened in the conversation and/or with general knowledge about the user 106. However, in some instances if a piece of context is not useful or may not be exploited on a particular smart device, then the piece of context may not be transferred to the particular smart device. To illustrate, if the virtual assistant 114 has identified a particular input mode that the user is using on a desktop computer as a piece of context, but that particular input mode is not available on a car system to which the virtual assistant 114 is to be transferred, then that piece of context (e.g., information identifying the particular input mode) may not be transferred to the car system when the virtual assistant 114 is transferred to the car system. In some examples, the information identifying the particular input mode used on the desktop computer may be retain and used when the virtual assistant 114 is transferred back to the desktop computer.

In the example of FIG. 7, after the virtual assistant 114 is transferred to the device 102, the virtual assistant 114 on the device 102 outputs a response 712 to the user's request. Here, the response 712 includes flight information that is relevant to the request for a flight from Spokane to Seattle on April 4 around 1 PM. In one example, the flight information is part of a web page of the airline. By providing the response 712 on the smart device 102, the user 106 may maintain communication with the virtual assistant 114 as the user 106 transitions to using the smart device 102. As also illustrated, the conversation user interface 706 on the smart device 102 may include an interface element 714 (e.g., button) to transfer the virtual assistant 114 to the smart device 104 or another device.

Although in the example of FIG. 7 the transfer of the virtual assistant 114 is triggered by the selection of the interface element 710, in other examples the virtual assistant 114 may be transferred by other events. In one example, the transfer may be triggered when the virtual assistant 114 determines that the user 106 would like to transfer to the device 102, either through explicit input of the user 106 and/or other input that suggests a transfer (e.g., a particular word or phrase that indicates that the user 106 is leaving work or otherwise moving away from the device 104). In another example, the transfer is triggered based on a location of the user 106, such as when the user moves away from the device 104 (e.g., beyond a predetermined proximity to the device 104) and/or when the user 106 is in closer proximity to the device 102 than the device 104. In yet a further example, the transfer may be triggered at a particular time, such as when a user normally leaves work (e.g., transfer the virtual assistant 114 from an office computer to a car system).

Example Process

FIGS. 8-11 illustrate example processes 800, 900, 1000, and 1100 for employing the techniques described herein. For ease of illustration processes 800, 900, 1000, and 1100 are described as being performed in the architecture 100 of FIG. 1. For example, one or more of the operations of the processes 800, 900, 1000, and 1100 may be performed by the smart device 102, the smart device 104, and/or the virtual assistant service 118. However, processes 800, 900, 1000, and 1100 may be performed in other architectures and the architecture 100 may be used to perform other processes.

The processes 800, 900, 1000, and 1100 (as well as each process described herein) are illustrated as a logical flow graph, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order and/or in parallel to implement the process. Further, any number of the individual operations may be omitted.

Figure 8:
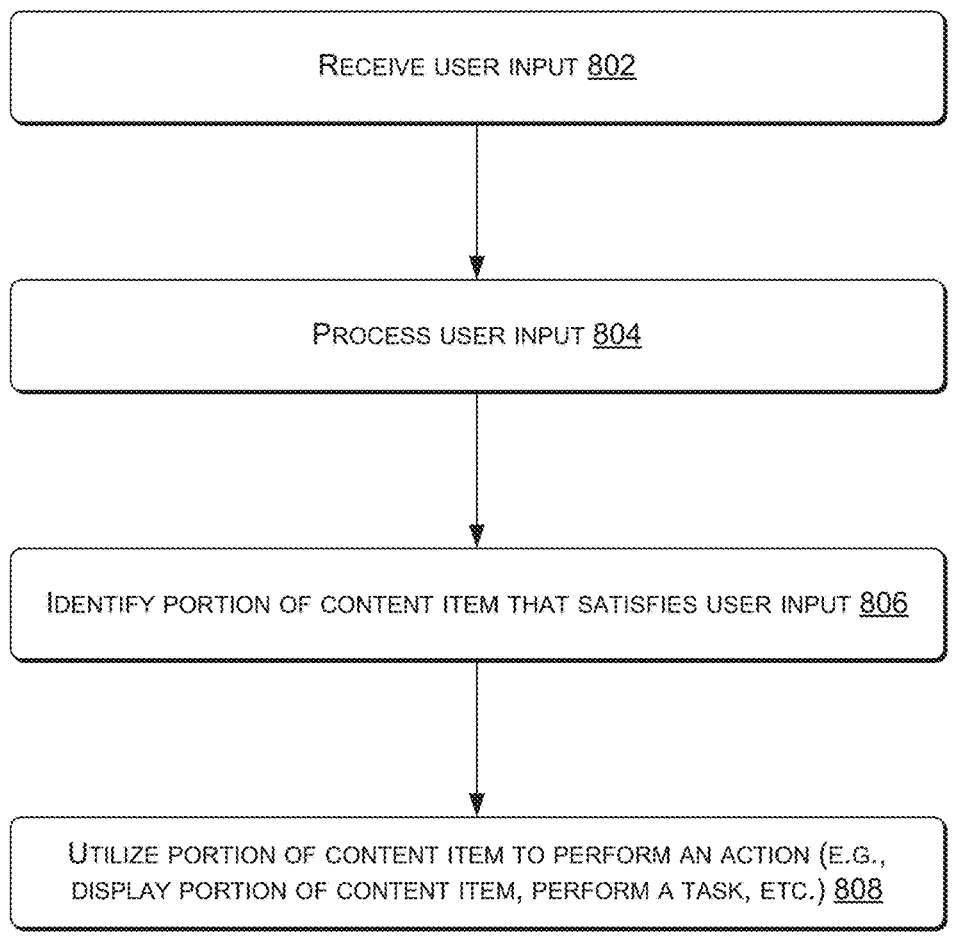
FIG. 8 illustrates an example process to interact with a portion of a content item that satisfies user input.

FIG. 8 illustrates the example process 800 that may be performed by the smart device 102/104 to interact with a portion of a content item that satisfies user input.

At 802, the smart device 102/104 may receive user input from the user 106. The input may comprise gesture input (e.g., received through a camera), touch input, text input, audio input, and/or speech input. In some instances, the input is received through the virtual assistant 114. The user input may request an action associated with a content item, such as presenting content that is relevant to a key term or phrase, performing a task for the user, and so on.

At 804, the smart device 102/104 may process the user input. The processing may convert the user input into a format that is understandable by a computing device. For example, if the input is speech or audio, the smart device 102/104 may perform speech recognition techniques to convert the input into a format that is understandable by a computing device (e.g., text). Additionally, or alternatively, the device 102/104 may perform NPL techniques to interpret or derive meaning of the input. In some instances, one or more pieces of context of an interaction between the user and the virtual assistant 114 may be determined, such as learned characteristics of the user, a conversation history, etc. The one or more pieces of context may be used may be used to interpret or derive meaning of the input. Although the operation 804 is illustrated as being included in the process 800, in some instances the operation 804 may be eliminated and/or performed by another device, such as the virtual assistant service 118.

At 806, the smart device 102/104 may identify (e.g., determine) a portion of a content that satisfies the user input. In some instances, this may include sending the user input to a remote computing device (e.g., the virtual assistant service 118) for processing and receiving information from the remote device indicating a portion of the content item that is relevant to the user input. In other instances, the operation 806 may include performing processing locally at the device 102/104 to identify the portion of the content item.

A portion of a content item may be identified at 806 by determining a portion of the content item that is relevant to the user input. This may include analyzing content of the content item (e.g., in real-time or based on a previous analysis) and/or analyzing tags that may be associated with portions of the content item. A portion of a content item may include text, images, audio, video, content to be projected, a module, a portion of a program/application, an interface element, or other content that is relevant to the user input. In some instances, a portion of a content item may be identified based on one or more display characteristics of the smart device 102/104, such as a screen dimension/area, screen resolution, etc.

At 808, the smart device 102/104 may utilize the portion of the content item that was identified at 806 to perform an action. For example, the device 102/104 may display the portion in a displayable format that is adapted to a display characteristic of the smart device 102/104 (e.g., adapted to a screen dimension, screen area, screen resolution, etc. of the smart device 102/104). To illustrate, a portion of a content item may be displayed on a mobile device (e.g., cell phone, tablet computer, etc.) such that the portion is viewable on the mobile device at a legibility level above a particular legibility threshold (e.g., so that the portion is displayed in a reader-friendly format). In another example, the device 102/104 may perform an action with the portion of the content item, such as a task that is requested by a user. To illustrate, the device 102/104 may, based on an identified a portion of a web site that relates to logging-in a user (e.g., user name and password input fields), log a user into the web site by providing the user name and password of the user. In other illustrations, other tasks may be performed, such as display information that is linked to a portion of a content item that is relevant to input (e.g., displaying an icon or other interface element that is linked to the portion), executing a portion of an program that is related to input, or otherwise interacting with the portion of the content item.

In some instances, the process 800 may enable a user to view content of a content item in a reader-friendly format (e.g., the user can read what is displayed). For example, if a content item is formatted for a display that is larger in area than a display of the smart device 102/104 (e.g., the content is designed to be viewed at a particular legibility level (e.g., text size) on a display that has one or more dimensions above a particular value), a portion of the content item may be identified for display on the smart device 102/104 so that the portion may actually be read on the smart device 102/104 in a legible manner. This may enable the user may view the portion without scrolling, zooming, or otherwise navigating within the content item.

Figure 9:
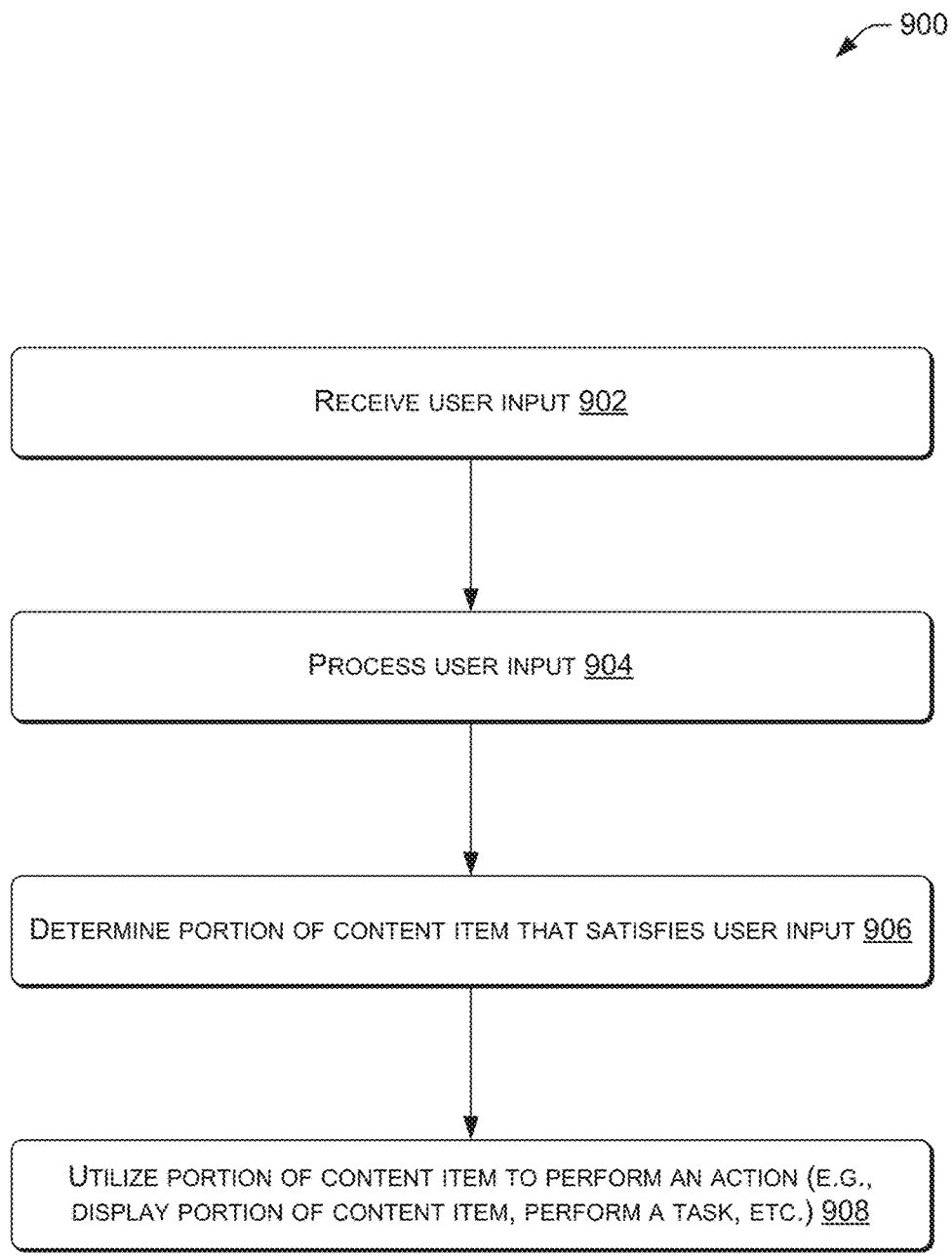
FIG. 9 illustrates an example process to cause a smart device to interact with a portion of a content item that satisfies user input.

FIG. 9 illustrates the example process 900 that may be performed by the virtual assistant service 118 to cause the smart device 102/104 to interact with a portion of a content item that satisfies user input.

At 902, the virtual assistant service 118 may receive user input from the small smart device 102/104 or another device. The user input may request an action associated with navigation to a content item. In one example, the input comprises speech input.

At 904, the virtual assistant service 118 may process the user input. For example, the service 118 may perform speech recognition techniques to convert the input into a format that is understandable by a computing device and/or perform NPL techniques to interpret or derive a meaning of the input. In some instances, one or more one or more pieces of context of an interaction between the user and the virtual assistant 114 may be determined and used to interpret or derive meaning of the input.

At 906, the virtual assistant service 118 may determine a portion of a content item that satisfies the user input. For example, the service 118 may analyze a content item to determine a portion of the content item that is relevant to the user input. Alternatively, or additionally, the service 118 may determine a portion of a content item that is tagged as being relevant to a term or phrase associated with the user input and/or that is tagged as being relevant to a particular request that is the same or has a threshold amount of similarity to the user input. In some instances, the content item is designed (e.g., formatted) to be viewed on a display that is larger than a display of the smart device 102/104, while the identified portion may be viewable on the device 102/104 at a particular legibility level.

At 908, the virtual assistant service 118 may utilize the portion of the content item that was determined at 906 to perform an action, such as causing the smart device 102/104 to display the portion of the content item in a format that is adapted to the smart device 102/104, performing a task (e.g., log a user into a site, book a flight, etc.), and so on.

Figure 10:
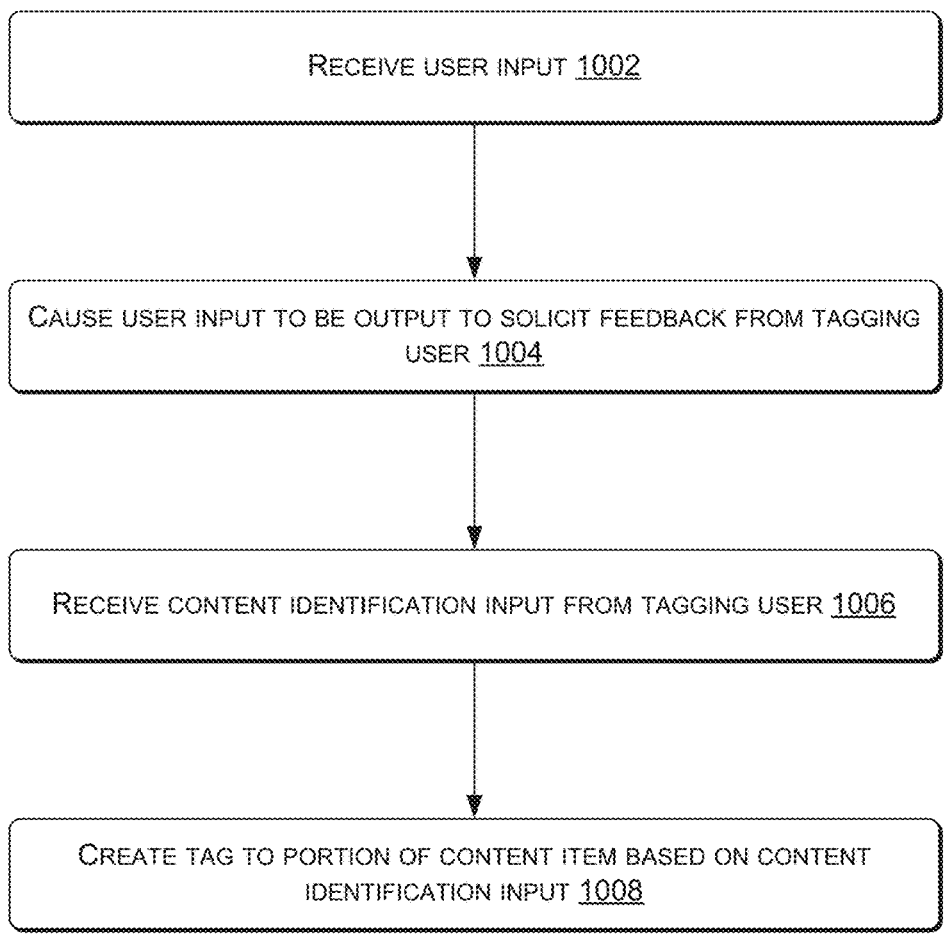
FIG. 10 illustrates an example process to tag a portion of a content item.

FIG. 10 illustrates the example process 1000 to tag a portion of a content item. In some instances, the process 1000 may be performed by the virtual assistant service 118, while in other instances the process 1000 may be performed by the smart device 102 or the smart device 104. For ease of illustration, the process 1000 will be described as being performed by the virtual assistant service 118.

At 1002, the virtual assistant service 118 may receive user input. The user input may be received from the smart device 102/104 and/or another device. The input may comprise gesture input (e.g., received through a camera), touch input, text input, audio, and/or speech input.

At 1004, the virtual assistant service 118 may cause the user input to be output to solicit feedback from a tagging user (e.g., the tagging user 134). For example, the service 118 may solicit an identification of a portion of a content item that is relevant to the user input. The user input may be output through a device associated with the service 118 and/or another device.

At 1006, the virtual assistant service 118 may receive content identification input from the tagging user. The content identification input may identify a portion of a content item that is relevant to the user input. That is, the content identification input may identify content of the content item that has been selected by the tagging user.

At 1008, the virtual assistant service 118 may create, based on the content identification input, a tag to be associated with (e.g., assigned to) the portion of the content item. The tag may indicate that the portion of the content item is relevant to a particular category or term associated with the user input. Alternatively, or additionally, the tag may associate the portion of the content item to the user input.

Figure 11:
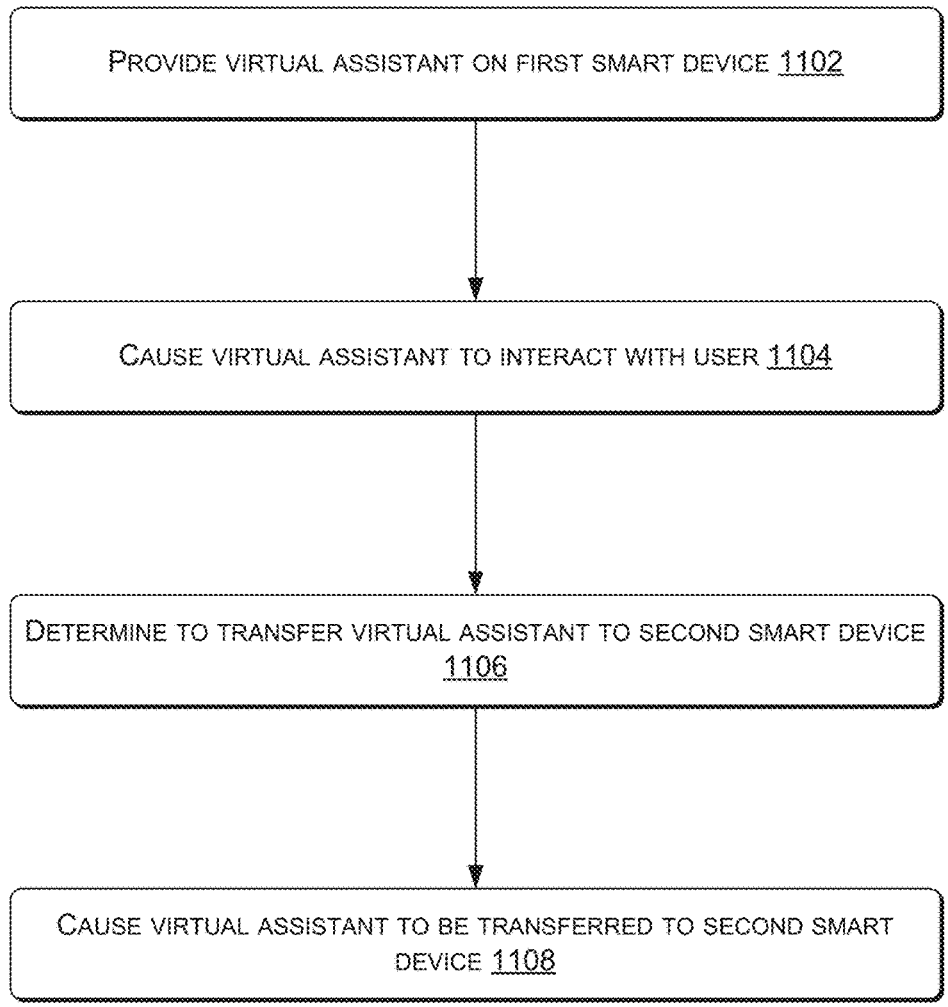
FIG. 11 illustrates an example process to cause an interaction with a virtual assistant to be transferred from a first smart device to second smart device.

FIG. 11 illustrates the example process 1100 to cause an interaction with a virtual assistant to be transferred from a first smart device to second smart device. For ease of illustration, the process 1100 is described as transferring the virtual assistant 114 from the smart device 104 to the smart device 102 in the architecture 100. However, it should be appreciated that the process 1100 may transfer the virtual assistant 114 from the smart device 102 to the smart device 104 and/or between other devices.

At 1102, the virtual assistant 114 may be output (e.g., provided) to the user 106 on the smart device 104 (first computing device). In some instances, the virtual assistant 114 may be output with the assistance of the virtual assistant service 118. The virtual assistant 114 may be output by outputting audio, displaying information (e.g., an avatar, conversation interface, etc.), or providing other content generally representing the virtual assistant 114 in one example, the virtual assistant 114 is represented in a conversation user interface, such as the conversation interface 706 of FIG. 7. In one example, the conversation user interface includes an interface element (e.g., button) that enables the user 106 to transfer the virtual assistant 114 to another device. The virtual assistant 114 may be output in conjunction with a site of a service provider.

At 1104, the smart device 104, with or without the assistance of the virtual assistant service 118, may cause the virtual assistant 114 to interact with the user 106. For example, the virtual assistant 114 may display one or more dialog representations within a conversation user interface, output one or more audio segments, provide content to solicit input from the user 106, provide a response to the user 106, and/or output input received from the user 106. As such, the virtual assistant 114 and the user 106 may interact through text, speech/audio, touch, or other means. In some instances, the interaction may include providing content that is related to a site of a service provide and/or receiving input from the user 106 that is related to the site. In one example, the interaction may include the user 106 requesting that an action related to the site be performed, such as a request to retrieve content of the site, and the virtual assistant 114 providing a response, such as content related to the service provider.

At 1106, the smart device 104 may determine to transfer the virtual assistant 114 to the smart device 102 (second smart device). For example, the smart device 104 may determine that input (e.g., speech, touch, text, etc.) from the user 106 requests that the virtual assistant 114 be transferred to the smart device 102, determine that the user 106 is located outside a predetermined distance to the smart device 104, determine that the user 106 is located within a predetermined distance to the smart device 102, and so on.

At 1108, the smart device 104, with or without the assistance of the virtual assistant service 118, may cause the virtual assistant 114 to be transferred to the smart device 102 (second computing device) to continue interaction of the virtual assistant 114 with the user 106 on the device 102. The virtual assistant 114 may be transferred by ceasing output of the virtual assistant 114, including the conversation user interface, on the smart device 104 and outputting the virtual assistant 114 on the smart device 102. In one example, the smart device 104 sends information to the smart device 104 via a network, short-range wireless technology (e.g., Bluetooth®), or other means, to cause the virtual assistant 114 to be output on the device 102. As such, in some instances the smart device 104 may communicate directly with the smart device 102 to cause the transfer. In another example, the virtual assistant service 118 manages the virtual assistant 114 to cause the transfer. In some instances, one or more pieces of context associated with the interaction of the virtual assistant 114 with the user 106 may be transferred to the smart device 102 with the transfer of the virtual assistant 114. At the smart device 102, the user 106 may continue the interaction with the virtual assistant 114 that was started on the smart device 104.

In some instances, by performing the process 1100 a user may maintain an interaction with a virtual assistant while transitioning between smart devices. In one example, the user may input a request on a smart device, transition to using another smart device, and receive a response to the input on the other smart device.

CONCLUSION

Although embodiments have been described in language specific to structural features and/or methodological acts, it is to be understood that the disclosure is not necessarily limited to the specific features or acts described. Rather, the specific features and acts are disclosed herein as illustrative forms of implementing the embodiments.

What is claimed is:

1. A computer-implemented method, comprising:
   receiving input from a user of a first smart device, the input requesting an action associated with a content item;
   identifying a portion of the content item that satisfies the input; and
   upon identifying the portion of the content item that satisfies the input, adapting a format of the content item for output on a second smart device having an operating characteristic different than an operating characteristic of the first smart device.

2. The computer-implemented method of claim 1, wherein identifying the portion of the content item that satisfies the input comprises determining a portion of the content item that is relevant to the input.

3. The computer-implemented method of claim 1, wherein identifying the portion of the content item that satisfies the input comprises identifying a portion of the content item that includes a tag related to the input.

4. The computer-implemented method of claim 1, wherein identifying the portion of the content item that satisfies the input comprises:
   sending the input to a remote computing device for processing; and
   receiving information from the remote computing device identifying the portion of the content item that satisfies the input.

5. The computer-implemented method of claim 1, wherein the portion of the content item comprises one of text, audio or one or more images that are relevant to the input.

6. The computer-implemented method of claim 1, wherein the identified portion of the content item is used to perform an action on the second smart device that satisfies the input.

7. The computer implemented method of claim 6, wherein the action includes one of displaying a portion of a content item, displaying information that is linked to a portion of a content item that is relevant to the input, executing a portion of a program that is related to the input, or entering information into a portion of a content item based on the input.

8. The computer-implemented method of claim 1, wherein the different operation characteristic includes one of display, audio, content, or storage type.

9. The computer-implemented method of claim 1, further comprising:
   causing a virtual assistant to be output via the first smart device to facilitate a conversation with the user;
   determining that the user is located within a predetermined distance to the second smart device;
   based at least in part on determining that the user is located within the predetermined distance to the second smart device and without having received user input to transfer the virtual assistant to the second smart device, determining to output the virtual assistant via the second smart device; and
   causing the virtual assistant to be output via the second smart device.

10. The computer-implemented method of claim 9, further comprising receiving user input at the first device, the user input comprising one or more of input, text input, touch input, or gesture input.

11. The computer-implemented method of claim 9, wherein identifying the portion of the content item that satisfies the input comprises determining a portion of the content item that is relevant to the input.

12. The computer-implemented method of claim 9, wherein identifying the portion of the content item that satisfies the input comprises identifying a portion of the content item that includes a tag related to the input.

13. The computer-implemented method of claim 9, wherein the portion of the content item comprises at least one of text, audio or one or more images that are relevant to the input.

14. The computer-implemented method of claim 9, wherein the different operation characteristic includes one of display, audio, content, or storage type.

15. The computer-implemented method of claim 9, further comprising:
   determining a time of day;
   wherein the determining to output the virtual assistant via the second smart device is based at least in part on the time of day.

\* \* \* \* \*